United States Patent
Yamada et al.

(10) Patent No.: US 9,973,832 B2
(45) Date of Patent: May 15, 2018

(54) SENSOR NODE AND METHOD OF CONTROLLING SENSOR NODE

(71) Applicant: FUJIKURA LTD., Tokyo (JP)

(72) Inventors: Yuji Yamada, Sakura (JP); Kenjiro Yano, Tokyo (JP); Masaki Nakayama, Tokyo (JP); Taku Taguchi, Sakura (JP); Hidetoshi Akita, Tokyo (JP)

(73) Assignee: FUJIKURA LTD., Tokyo (JP)

(*) Notice: Subject to any disclaimer, the term of this patent is extended or adjusted under 35 U.S.C. 154(b) by 0 days. days.

(21) Appl. No.: 15/114,669

(22) PCT Filed: Feb. 2, 2015

(86) PCT No.: PCT/JP2015/052895
§ 371 (c)(1),
(2) Date: Jul. 27, 2016

(87) PCT Pub. No.: WO2015/115654
PCT Pub. Date: Aug. 6, 2015

(65) Prior Publication Data
US 2016/0345081 A1 Nov. 24, 2016

(30) Foreign Application Priority Data
Jan. 31, 2014 (JP) .................. 2014-016943

(51) Int. Cl.
*G08C 19/22* (2006.01)
*H04Q 9/00* (2006.01)

(52) U.S. Cl.
CPC .......... *H04Q 9/00* (2013.01); *H04Q 2209/40* (2013.01); *H04Q 2209/823* (2013.01); *H04Q 2209/883* (2013.01); *H04Q 2209/886* (2013.01)

(58) Field of Classification Search
CPC .............. H04Q 9/00; H04Q 2209/883; H04Q 2209/40; H04Q 2209/886; H04Q 2209/823
(Continued)

(56) References Cited

U.S. PATENT DOCUMENTS

2006/0128445 A1   6/2006  Kimata
2012/0153726 A1*  6/2012  Moon ................. H02J 3/32
                                              307/46
(Continued)

FOREIGN PATENT DOCUMENTS

EP    1675255 A2   6/2006
JP    2003-346271 A  12/2003
(Continued)

OTHER PUBLICATIONS

Office Action of Japanese Patent Application No. 2014-016943, dated Jul. 8, 2014.
(Continued)

*Primary Examiner* — Tanmay Shah
(74) *Attorney, Agent, or Firm* — Sughrue Mion, PLLC

(57) ABSTRACT

A sensor node includes a power generator, a power storage, a transmitter having an environment sensor, a transmission controller, and a transmission unit, a first switcher provided between the transmission controller and the power storage, and a second switcher provided between the transmission unit and the power storage. In a case where the storage capacity of the power storage decreases to a first threshold or less and then the storage capacity increases, when the storage capacity reaches the first threshold, the first switcher is brought into an on-state and the first switcher supplies electric power to the transmission controller. When the storage capacity reaches a second threshold higher than the first threshold, the second switcher is brought into an on-state and the second switcher supplies electric power to the transmission unit.

14 Claims, 17 Drawing Sheets

(58) Field of Classification Search
USPC .................................................. 340/870.07
See application file for complete search history.

(56) References Cited

U.S. PATENT DOCUMENTS

| | | | |
|---|---|---|---|
| 2012/0239297 | A1 | 9/2012 | Yokota et al. |
| 2014/0008978 | A1 | 1/2014 | Sasaki et al. |
| 2015/0123480 | A1* | 5/2015 | Xu ....................... H02J 7/0068 307/66 |

FOREIGN PATENT DOCUMENTS

| | | | |
|---|---|---|---|
| JP | 2005-141439 | A | 6/2005 |
| JP | 2006-166376 | A | 6/2006 |
| JP | 2008-97423 | A | 4/2008 |
| JP | 2008-292319 | A | 12/2008 |
| JP | 2009-212709 | A | 9/2009 |
| JP | 2009-275427 | A | 11/2009 |
| JP | 2010-224701 | A | 10/2010 |
| JP | 2011-199656 | A | 10/2011 |
| JP | 2012-198715 | A | 10/2012 |
| JP | 2013-89317 | A | 5/2013 |

OTHER PUBLICATIONS

International Search Report of PCT/JP2015/052895, dated Mar. 31, 2015. [PCT/ISA/210].
Communication dated Mar. 7, 2017 from the Japanese Patent Office in counterpart Japanese application No. 2015-560073.
Communication dated Jul. 21, 2017, from European Patent Office in counterpart application No. 15743551.2.

* cited by examiner

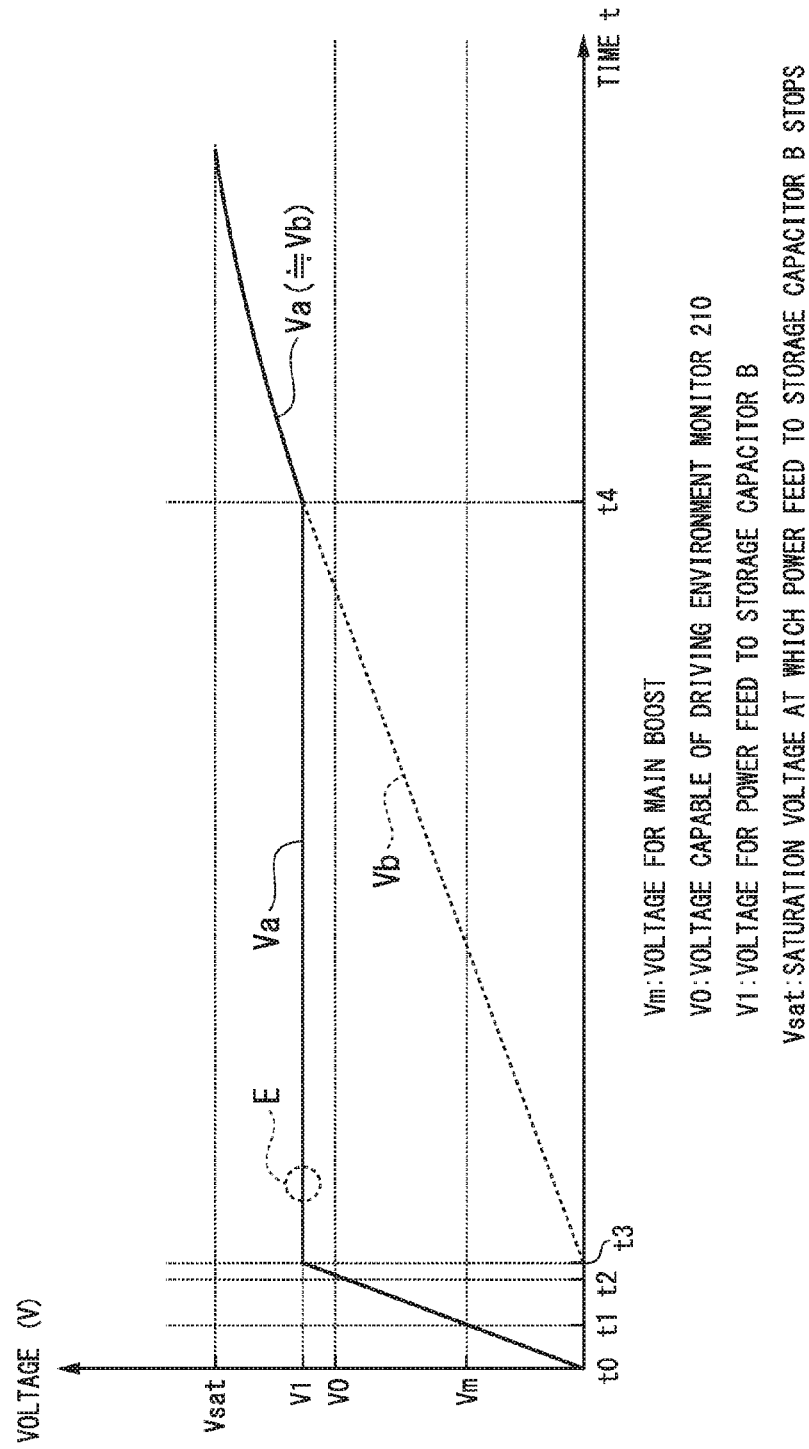

FIG. 7B

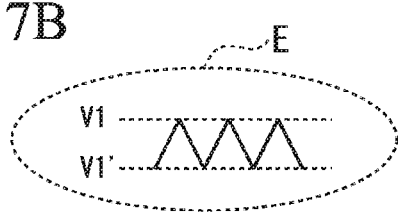

FIG. 8A

Mode0: TRANSMISSION TIME INTERVAL = REFERENCE SET TIME
Mode1: TRANSMISSION TIME INTERVAL = REFERENCE SET TIME × 2
Mode2: TRANSMISSION TIME INTERVAL = REFERENCE SET TIME × 10
Mode4: TRANSMISSION TIME INTERVAL = REFERENCE SET TIME × 20

| Mode0 | Mode1 | Mode2 | Mode4 |
|---|---|---|---|
| T1 | 2×T1 | 10×T1 | 20×T1 |
| T2 | 2×T2 | 10×T2 | 20×T2 |
| T3 | 2×T3 | 10×T3 | 20×T3 |
| T4 | 2×T4 | 10×T4 | 20×T4 |
| ⋮ | ⋮ | ⋮ | ⋮ |

FIG. 8B

| ILLUMINANCE SENSOR IS PRESENT | | ILLUMINANCE | |
|---|---|---|---|
| | | HIGH | LOW |
| VOLTAGE | HIGH | Mode0 | Mode1 |
| | LOW | Mode1 | Mode2 |

FIG. 8C

| ILLUMINANCE SENSOR IS PRESENT | ILLUMINANCE | |
|---|---|---|
| | HIGH | LOW |
| NO VOLTAGE VALUE | Mode0 | Mode2 |

FIG. 16

Mode0: TRANSMISSION TIME INTERVAL = REFERENCE SET TIME
Mode1: TRANSMISSION TIME INTERVAL = REFERENCE SET TIME × 2
Mode2: TRANSMISSION TIME INTERVAL = REFERENCE SET TIME × 10
Mode3: TRANSMISSION TIME INTERVAL = REFERENCE SET TIME × 0.5
Mode4: TRANSMISSION TIME INTERVAL = REFERENCE SET TIME × 20

| Mode0 | Mode1 | Mode2 | Mode3 | Mode4 |
|---|---|---|---|---|
| T1 | 2 × T1 | 10 × T1 | 0.5 × T1 | 20 × T1 |
| T2 | 2 × T2 | 10 × T2 | 0.5 × T2 | 20 × T2 |
| T3 | 2 × T3 | 10 × T3 | 0.5 × T3 | 20 × T3 |
| T4 | 2 × T4 | 10 × T4 | 0.5 × T4 | 20 × T4 |
| ⋮ | ⋮ | ⋮ | ⋮ | ⋮ |

SENSOR NODE AND METHOD OF CONTROLLING SENSOR NODE

CROSS REFERENCE TO RELATED APPLICATIONS

This application is a National Stage of International Application No. PCT/JP2015/052895 filed Feb. 2, 2015, claiming priority based on Japanese Patent Application No. 2014-016943, filed Jan. 31, 2014, the contents of all of which are incorporated herein by reference in their entirety.

TECHNICAL FIELD

The present invention relates to a sensor node which acquires information relating to a surrounding environment using a sensor and transmits the acquired information, and a method of controlling a sensor node.

BACKGROUND ART

In recent years, wireless sensor nodes have been attracting attention. Sensor nodes are expected to be used in various fields, such as smart houses and factory plants, due to a feature of there being no wiring.

As such a wireless sensor, an associated sensor control device is known (for example, see Patent Document 1). The sensor control device described in Patent Document 1 realizes power saving in units of terminal groups.

An associated sensor system is known (for example, see Patent Document 2). In the sensor system described in Patent Document 2, when one sensor detects abnormality, an environmental change in another sensor can be measured in detail. Furthermore, a measurement communicator with power generation which includes a power generator, a power storage, and a communicator, and performs control for changing a communication interval according to a power generation amount is known (for example, see Patent Document 3).

PRIOR ART DOCUMENTS

Patent Documents

[Patent Document 1] Japanese Unexamined Patent Application, First Publication No. 2012-198715
[Patent Document 2] Japanese Unexamined Patent Application, First Publication No. 2010-224701
[Patent Document 3] Japanese Unexamined Patent Application, First Publication No. 2003-346271

SUMMARY OF INVENTION

Problems to be Solved by the Invention

However, in the systems described in Patent Documents 1 and 2, while a battery is provided, a user starts operation after charging the battery in advance. In a case where a battery is provided, when the battery lifetime has expired, a user needs to replace the battery and a lot of effort is required. Even in a case of starting operation after charging the battery, the user needs to charge the battery and a lot of effort is required.

In the communicator described in Patent Document 3, in order to obtain the energy revenue and expenditure balance between the power generation amount and the power consumption, the communication interval is changed according to the power generation amount. However, in a case where an environmental power generator with little generated electric power, like a sensor node, is used, it is difficult to quickly recover the communicator from a state where the energy revenue and expenditure balance collapses.

The invention has been accomplished in consideration of this situation, and an object of the invention is to provide a sensor node including an environmental power generator with little power generation capable of quickly recovering a sensor function even in a case where the energy revenue and expenditure balance between the power generation amount and the power consumption collapses, and a method of controlling a sensor node.

Means for Solving the Problems

A sensor node according to a first aspect of the invention includes a power generator configured to perform environmental power generation, a power storage configured to store energy generated by the power generator to generate a power supply, a transmitter having an environment sensor, a transmission controller, and a transmission unit, the environment sensor being configured to acquire information relating to the surrounding environment, a first switcher provided between the transmission controller and the power storage, and a second switcher provided between the transmission unit and the power storage. In a case where the storage capacity of the power storage decreases to a first threshold or less and then the storage capacity increases, when the storage capacity reaches the first threshold, the first switcher is brought into an on-state and the first switcher supplies electric power to the transmission controller. When the storage capacity reaches a second threshold higher than the first threshold, the second switcher is brought into an on-state and the second switcher supplies electric power to the transmission unit.

According to the sensor node of the first aspect, in the sensor node including the environmental power generator with little generated electric power, it is possible to quickly recover the sensor node even in a case where the energy revenue and expenditure balance between the power generation amount and the power consumption collapses.

In the sensor node according to the first aspect of the invention, in a case where the storage capacity is equal to or greater than the first threshold and less than the second threshold, the transmission controller may temporarily bring the second switcher into the on-state, the second switcher may temporarily supply electric power to the transmission unit, and the transmission controller may cause the transmission unit to transmit the information acquired by the environment sensor and then may bring the second switcher into an off-state.

In the sensor node according to the first aspect of the invention, after the first switcher is brought into the on-state, when initial communication by the transmission unit is performed, the transmission controller may cause the transmission unit to transmit an activation notification.

In the sensor node according to the first aspect of the invention, the first switcher may supply electric power to the environment sensor simultaneously with supplying electric power to the transmission controller.

In the sensor node according to the first aspect of the invention, in a case where the storage capacity increases to the second threshold or more and then the storage capacity decreases, when the storage capacity reaches a third threshold equal to or less than the second threshold and greater than the first threshold, the second switcher may be brought into the off-state and the second switcher may shut off the supply of electric power to the transmission unit, and when the storage capacity reaches a fourth threshold equal to or less than the first threshold, the first switcher may be brought into an off-state and the first switcher may shut off the supply of electric power to the transmission controller.

In the sensor node according to the first aspect of the invention, the power storage may have a first storage capacitor, and a second storage capacitor which has capacity greater than the capacity of the first storage capacitor.

In the sensor node according to the first aspect of the invention, in a case where the storage capacity of the first storage capacitor is equal to or greater than the first threshold, the first switcher may be brought into the on-state. In a case where the storage capacity of the second storage capacitor is equal to or greater than the second threshold, the second switcher may be brought into the on-state.

In the sensor node according to the first aspect of the invention, the power storage may have a switch between the first storage capacitor and the second storage capacitor; in a case where the storage capacity is less than the first threshold, the power generator and the first storage capacitor may be connected to each other, the switch may be brought into an off-state, and the supply of electric power to the second storage capacitor may be shut off; and in a case where the storage capacity reaches the first threshold, the switch may be brought into an on-state and electric power may be supplied to the second storage capacitor.

The sensor node according to the first aspect of the invention may further include a detector configured to detect the amount of energy generated by the power generator, the transmission unit may transmit a transmission signal including the information acquired by the environment sensor in a wireless manner, and the transmission controller may change a mode of a transmission operation in the transmission unit based on a detection result of the amount of energy generated in the power generator from the detector.

In this sensor node, the storage capacity (the amount of energy) generated by the power generator is detected by the detector, and the mode (for example, the transmission interval time) of the transmission operation in the transmission unit is changed according to the generated storage capacity. With this, the sensor node obtains the energy revenue and expenditure balance between generated electric power and power consumption. With this, the sensor node can achieve a battery-less structure.

The storage capacity generated by the power generator is detected by the detector, and the mode (for example, the transmission interval time) of the transmission operation in the transmission unit may be changed according to the generated storage capacity.

In the sensor node according to the first aspect of the invention, the transmission controller may acquire information relating to the storage capacity of the power storage and may change a mode of a transmission operation in the transmission unit based on the acquired information relating to the storage capacity.

In this sensor node, the information relating to the storage capacity of the electricity storage is acquired by detecting the voltage of the electricity storage, and the mode (for example, the transmission interval time) of the transmission operation in the transmission unit is changed based on the acquired information relating to the storage capacity. With this, the sensor node can change the mode (for example, the transmission interval time) of the transmission operation according to the amount of generated energy of the power generator and the storage capacity of the electricity storage when transmitting the transmission signal of the environmental information from the transmission unit in a wireless manner.

In the sensor node according to the first aspect of the invention, in a case where the storage capacity of the power storage exceeds a predetermined threshold, a mode of a transmission operation in the transmission unit may be changed such that consumption of energy stored in the power storage is increased.

In the sensor node according to the first aspect of the invention, the power generator may be a solar battery, an acquisition sensor which measures the storage capacity generated by the power generator may be an illuminance sensor, and the solar battery may be a solar battery which is used in low illuminance and which is usable in an environment of predetermined amount of illuminance or less.

In the sensor node according to the first aspect of the invention, each of the first switcher and the second switcher may include a DC/DC converter.

In a method of controlling a sensor node according to a second aspect of the invention, the sensor node includes a power generator configured to perform environmental power generation; a power storage configured to store energy generated by the power generator to generate a power supply; a transmitter having an environment sensor, a transmission controller, and a transmission unit, the environment sensor being configured to acquire information relating to the surrounding environment; a first switcher provided between the transmission controller and the power storage; and a second switcher provided between the transmission unit and the power storage. The method of controlling a sensor node according to the second aspect of the invention includes: bringing the first switcher into an on-state in a case where the storage capacity of the power storage decreases to a first threshold or less and then the storage capacity increases, when the storage capacity reaches the first threshold; causing the first switcher to supply electric power to the transmission controller; bringing the second switcher into an on-state when the storage capacity reaches a second threshold higher than the first threshold; and causing the second switcher to supply electric power to the transmission unit.

According to the method of controlling a sensor node of the second aspect, in the sensor node including the environmental power generator with little generated electric power, it is possible to quickly recover the sensor node even in a case where the energy revenue and expenditure balance between the power generation amount and the power consumption collapses.

Effects of the Invention

According to the above-described aspects of the invention, in the sensor node including the environmental power generator with little generated electric power, it is possible to quickly recover the sensor node even in a case where the energy revenue and expenditure balance between the power generation amount and the power consumption collapses.

BRIEF DESCRIPTION OF THE DRAWINGS

FIG. 7A is an explanatory view showing an image of change in voltage in each of the first storage capacitor A 121 and the second storage capacitor B 122.

FIG. 7B is an enlarged view showing a portion indicated by symbol E in FIG. 7A.

FIG. 8A is an explanatory view showing the types of modes for setting a transmission time interval.

FIG. 8B is an explanatory view showing the types of modes for setting a transmission time interval.

FIG. 8C is an explanatory view showing the types of modes for setting a transmission time interval.

FIG. 16 is an explanatory view showing the types of modes for setting a transmission time interval in the third embodiment.

EMBODIMENTS FOR CARRYING OUT THE INVENTION

Hereinafter, a sensor node in an embodiment of the invention will be described with reference to the drawings.

First Embodiment

Figure 1:
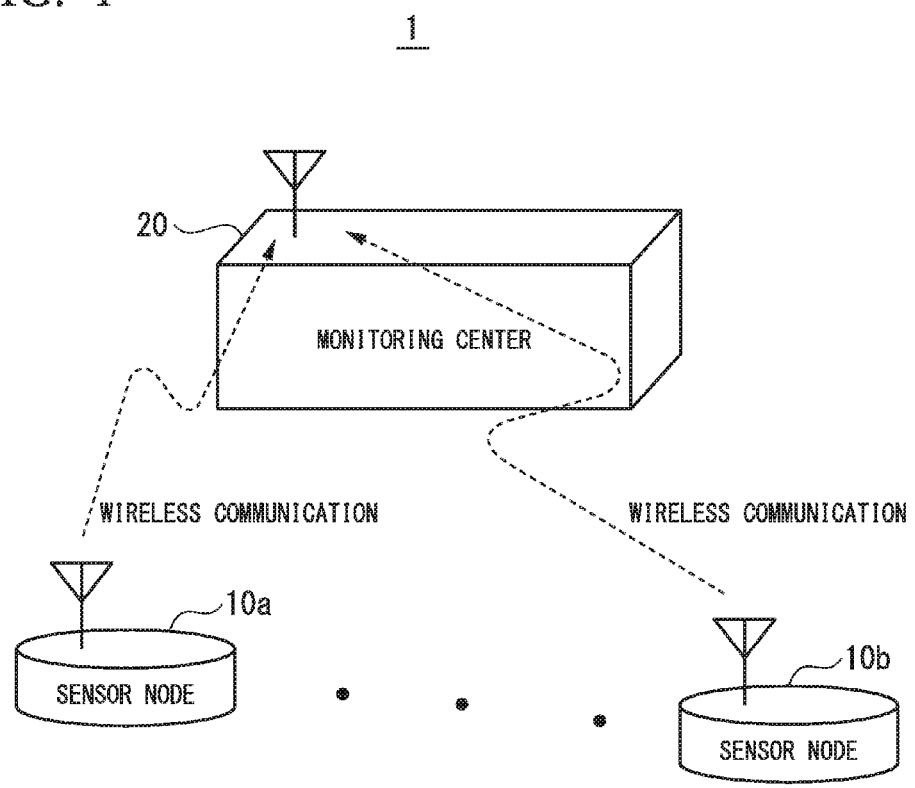
FIG. 1 is an explanatory view showing the outline of a wireless sensor system in which a sensor node in a first embodiment is used.

FIG. 1 is an explanatory view showing the outline of a wireless sensor system 1 in which a sensor node of this embodiment is used. As shown in FIG. 1, the wireless sensor system 1 includes a monitoring center 20, and sensor nodes 10a and 10b. The monitoring center 20 collects the measurement results of a surrounding environment in the sensor nodes 10a and 10b and performs arithmetic processing and the like on the collected measurement results. The sensor nodes 10a and 10b transmit the measurement results to the monitoring center 20 in a wireless manner.

The measurement results include information detected by the sensor nodes 10a and 10b, for example, information indicating temperature, humidity, $CO_2$ concentration, vibration, water level, illuminance, voltage, current, voice, images, and the like. The measurement results may include a determination result of the presence or absence of a person using an infrared sensor or the like. In addition, the sensor nodes 10a and 10b may be stationary devices, wall-mounted devices, or devices of a type being attached to a wall.

The sensor nodes 10a and 10b operate with electric power supplied from an energy harvest (environmental power generation) power supply, and it is not necessary to provide power supply wiring or the like; thus, the degree of freedom for arrangement is increased.

In FIG. 1, although the two sensor nodes 10a and 10b are shown as a sensor node, the number of sensor nodes may be one, or three or more.

The sensor node 10a and the sensor node 10b have the same configuration, and in the following description, one or both of the sensor node 10a and the sensor node 10b are referred to as a sensor node 10. The configurations of the sensor node 10a and the sensor node 10b may be different from each other.

Figure 2:
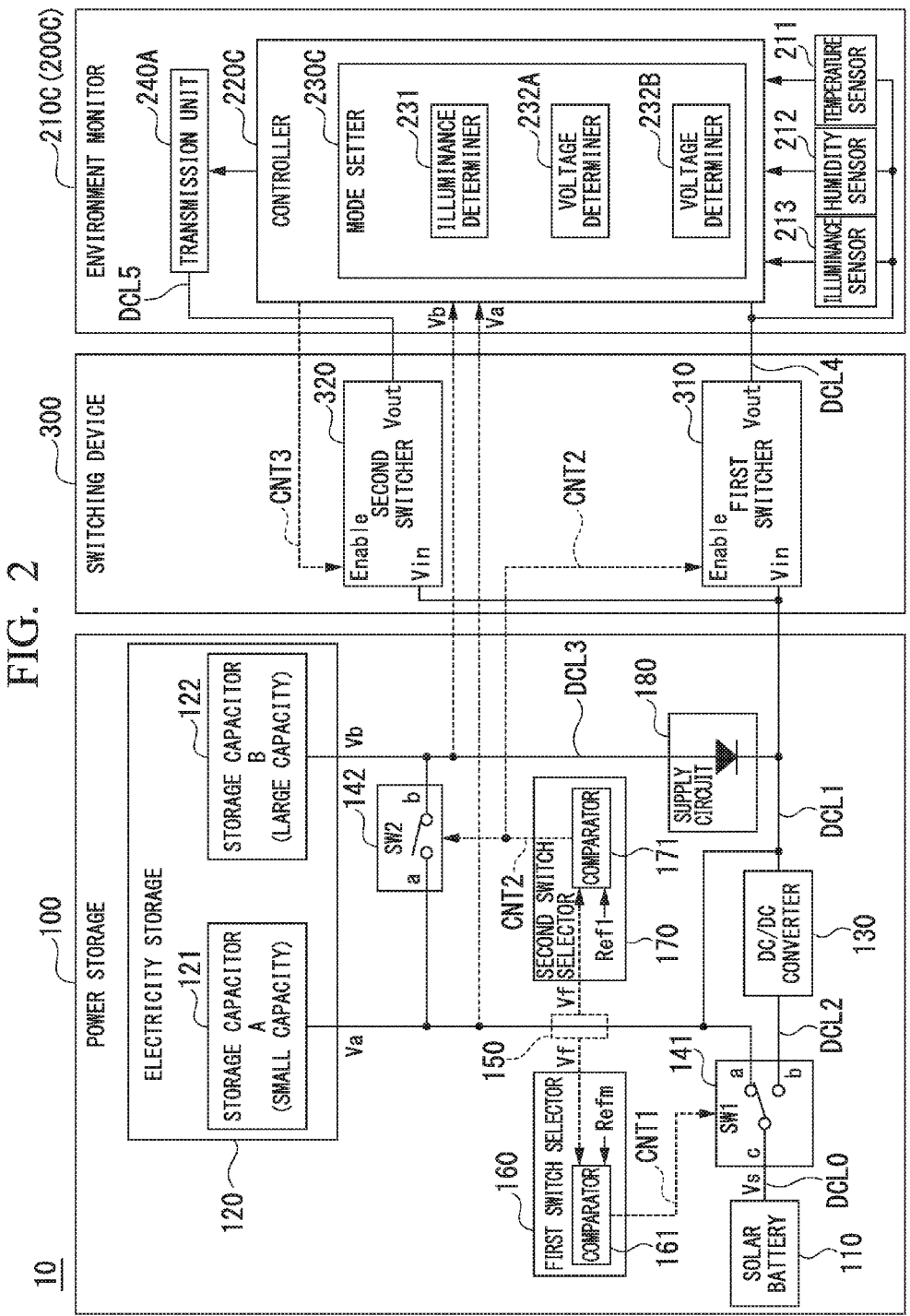
FIG. 2 is a block diagram showing the configuration of the sensor node in the first embodiment.

FIG. 2 is a block diagram showing the configuration of the sensor node in this embodiment.

The sensor node 10 is, for example, a sensor node which is installed in a room, such as an office, and a sensor node to which a power supply is supplied by solar or indoor photovoltaic generation. The sensor node 10 acquires environmental information relating to temperature and humidity and transmits the environmental information to the monitoring center 20 regularly in a wireless manner. The sensor node 10 autonomously changes a transmission time interval when transmitting a signal to the monitoring center 20 according to the power generation amount of the solar or indoor photovoltaic generation, thereby obtaining the energy revenue and expenditure balance between generated electric power and power consumption.

As shown in FIG. 2, the sensor node 10 has a power storage 100 which stores the generated electric power of the solar battery 110 in an electricity storage 120 to generate a power supply, a communicator 200C to which electric power is fed from the power storage 100, and a switching device 300. The communicator 200C (transmitter) includes an environment monitor 210C and functions a wireless sensor. The power storage 100 supplies electric power to the environment monitor 210C through the switching device 300. The power storage 100, the communicator 200, and the switching device 300 may be constituted on separate substrates, or may be constituted on the same substrate.

Power Storage

The power storage 100 includes a solar battery 110, an electricity storage 120, and a DC/DC converter 130. The solar battery 110 is a solar battery which is used in low illuminance, and is, for example, a solar battery which is used with illuminance equal to or less 10000 Lux. In the power storage 100, the generated electric power of the solar battery 110 is fed to the electricity storage 120, and thus, electric power is stored in the electricity storage 120. The power storage 100 becomes a power supply which feeds electric power stored in the electricity storage 120 to the environment monitor 210C.

The DC/DC converter 130 performs voltage adjustment such that a voltage output from the DC/DC converter 130 becomes a predetermined voltage, and outputs the voltage to a feeder line. That is, the DC/DC converter 130 has a function of boosting and deboosting a voltage Vs of the solar battery 110.

The electricity storage 120 has a first storage capacitor A 121 with small capacity and a second storage capacitor B 122 with large capacity. The storage capacitors are, for example, electric double layer capacitors or the like. The first storage capacitor A 121 with small capacity is a capacitor for fast charging, is charged fast with the generated electric power of the solar battery 110, and supplies the fast-charged voltage to the environment monitor 210C, thereby advancing the activation of the environment monitor 210C. The second storage capacitor B 122 with large capacity is a main storage battery which is used to drive the environment monitor 210C over a long period of time (for example, for two days). That is, the rising of the sensor node 10 is performed using the electric power stored in the first storage capacitor A 121, and after the voltage of the first storage capacitor A 121 exceeds a first threshold, the sensor node 10 is driven using the electric power stored in the second storage capacitor B 122. The details of the configuration and operation of the power storage 100 will be described below.

In the following description, the first storage capacitor A 121 is simply referred to as a "first storage capacitor A", and the second storage capacitor B 122 is simply referred to as a "second storage capacitor B".

Next, the configuration of the power storage 100 will be described specifically.

The power storage 100 includes the solar battery 110, the electricity storage 120, the DC/DC converter 130, a first switch 141, a second switch 142 (switch), a voltage detector 150, a first switch selector 160, a second switch selector 170, and a supply circuit 180.

Figure 3A:
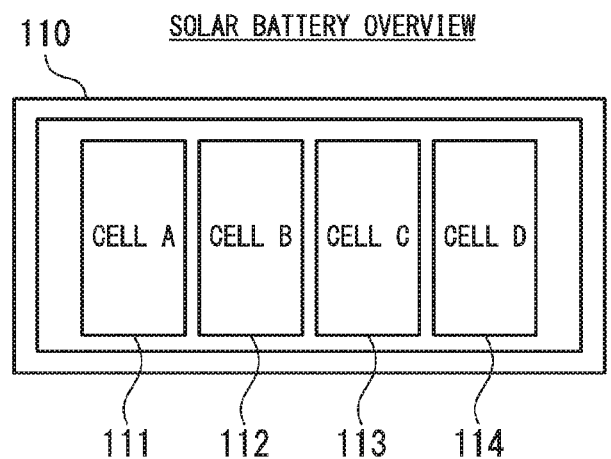
FIG. 3A is an explanatory view showing the overview of a solar battery and a connection state of solar battery cells.
Figure 3B:
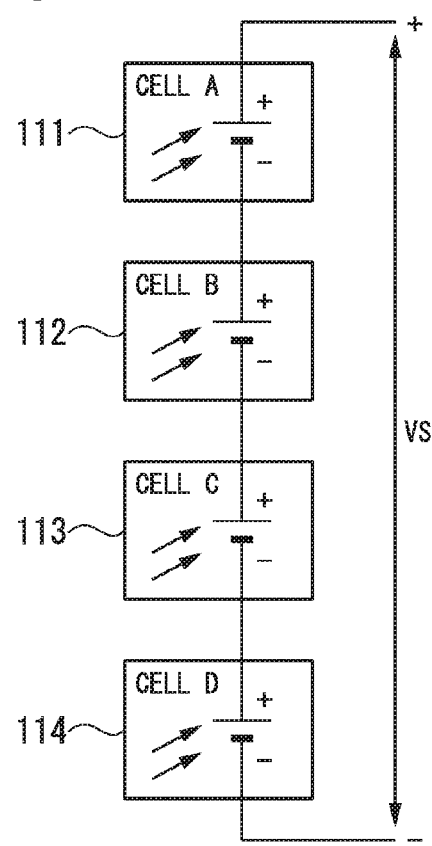
FIG. 3B is an explanatory view showing the overview of a solar battery and a connection state of solar battery cells.

The solar battery 110 is a solar battery which is used in low illuminance shown in FIGS. 3A and 3B. The electricity storage 120 is constituted of a storage capacitor for power storage corresponding to the application of energy harvest, and has the first storage capacitor A 121 with small capacity and the second storage capacitor B 122 with large capacity. Each of the first storage capacitor A 121 and the second storage capacitor B 122 may be a secondary battery.

The magnitude of the capacity of the first storage capacitor A 121 is selected in consideration of the time until electric power is fed from the solar battery 110 and the voltage of the first storage capacitor A 121 rises to a voltage capable of driving the environment monitor 210C, the degree of a voltage drop of the first storage capacitor A 121 when electric power is fed from the first storage capacitor A 121 to the second storage capacitor B 122, and the time for which the environment monitor 210C can be continuously driven from the first storage capacitor A 121.

The magnitude of the capacity of the second storage capacitor B 122 is selected according to the load capacity of the environment monitor 210C and the time for which the environment monitor 210C can be continuously driven. For example, the capacity of the second storage capacitor B 122 is selected such that the capacity ratio of the first storage capacitor A 121 and the second storage capacitor B 122 becomes about several times to several tens of times.

Figure 4:
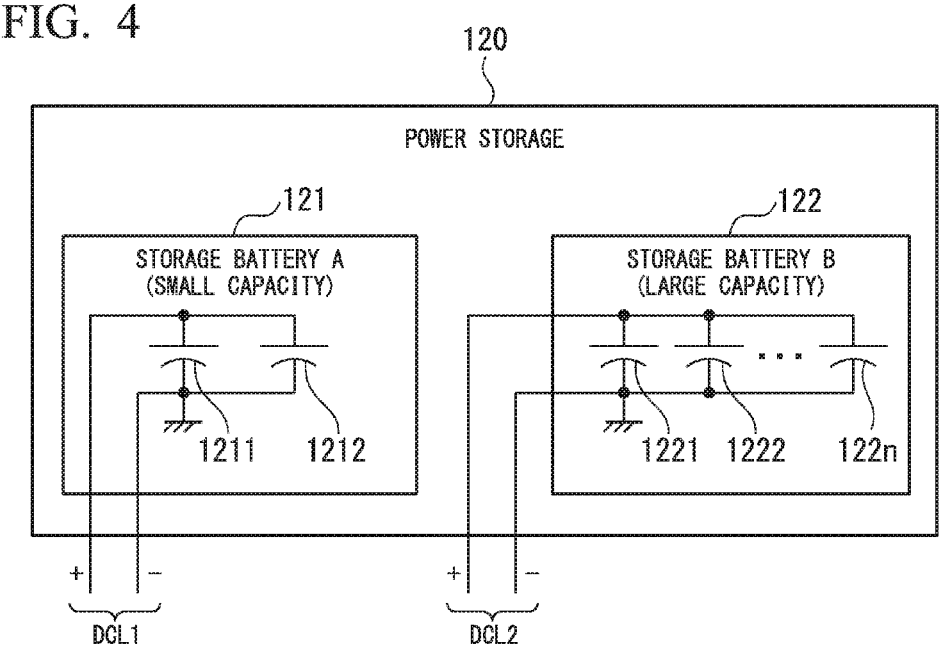
FIG. 4 is a configuration diagram showing an example where each of a first storage capacitor A 121 and a second storage capacitor B 122 is constituted of a plurality of storage capacitors.

Each of the first storage capacitor A 121 and the second storage capacitor B 122 may be constituted of a single storage capacitor, or as shown in FIG. 4, may be constituted of a plurality of storage capacitors. The example shown in FIG. 4 is, for example, an example where the first storage capacitor A 121 is constituted of two storage capacitors including a storage capacitor 1211 and storage capacitor 1212, and the second storage capacitor B 122 is constituted of n storage capacitors including a storage capacitor 1221, a storage capacitor 1222, . . . , and a storage capacitor 122n.

That is, each of the first storage capacitor A 121 and the second storage capacitor B 122 can be constituted of an arbitrary number of storage capacitors. Instead of a storage capacitor, a secondary battery may be used.

Returning to FIG. 2, the DC/DC converter 130 is constituted by a DC/DC converter device or the like, receives the output voltage Vs of the solar battery 110 as input, boosts the input voltage Vs to a predetermined voltage, and outputs the predetermined voltage to a feeder line DCL1.

The output side of the solar battery 110 is connected to a common contact c of a switch SW1 of the first switch 141 through a feeder line DCL0. A contact a of the first switch 141 is connected to the feeder line DCL1. A contact b is connected to the input side of the DC/DC converter 130 through a feeder line DCL2. The switch SW1 of the first switch 141 switches the connection between the contact c and the contact a and the connection between the contact b and the contact c according to an instruction content of a control signal CNT1 input from the first switch selector 160.

The second switch 142 brings an internal switch SW2 into an ON (closed) state or an OFF (open) state according to an instruction content of a control signal CNT2 input from the second switch selector 170 to connect or disconnect between the feeder line DCL1 and the feeder line DCL3. That is, first storage capacitor A 121 and the second storage capacitor B 122 are electrically connected in parallel through the switch SW2 by bringing the switch SW2 into the on-state, and the first storage capacitor A 121 and the second storage capacitor B 122 are electrically disconnected from each other by bringing the switch SW2 into the off-state.

In FIG. 2, although an example where the first switch 141 and the second switch 142 are respectively constituted of the switches SW1 and the SW2 using mechanical contacts has been described, in practice, the switches SW1 and SW2 may include semiconductor switches using a semiconductor switching element, such as a metal oxide semiconductor field effect transistor (MOSFET) or an insulated gate bipolar transistor (IGBT).

In FIG. 2, although each of the feeder line DCL0, the feeder line DCL1, the feeder line DCL2, and the feeder line DCL3 is indicated by a single line, in practice, each feeder line includes a positive electrode-side feeder line and a negative electrode-side feeder line (or a ground line). Each of the switches SW1 and SW2 may be a one-circuit switch which switches the connection state of, for example, only the positive electrode-side feeder line of the positive electrode-side feeder line and the negative electrode-side feeder line, or a two-circuit switch which switches the connection states of both of the positive electrode-side feeder line and the negative electrode-side feeder line.

The voltage detector 150 is constituted, for example, using a resistance voltage divider circuit, and detects the voltage of the feeder line DCL1. The voltage of the feeder line DCL1 is the same voltage as a voltage Va of the first storage capacitor A 121, the voltage detector 150 detects the voltage of the feeder line DCL1, and as a result, the voltage Va which is the charged voltage of the first storage capacitor A 121 is detected. The voltage detector 150 outputs a detection signal Vf of the voltage Va of the first storage capacitor A 121 to the first switch selector 160 and the second switch selector 170.

The first switch selector 160 includes a comparator 161, and the comparator 161 compares the detection signal Vf of the voltage Va of the first storage capacitor A 121 with a predetermined reference voltage Refm output from a reference voltage generation circuit (not shown). With this, the storage capacity is compared to a predetermined threshold described below.

On the other hand, in a case where charging is performed from a state where the voltage of the first storage capacitor A 121 is a low voltage close to 0 V (zero volt), a general DC/DC converter can only boost a voltage with very low efficiency, and a conversion loss is increased at the time of boosting. This state is referred to as a start-up mode or a cold start mode, and causes a significant problem in a case of storing weak electric power, like energy harvest. That is, the DC/DC converter 130 can perform a high-efficiency boosting operation, called main boost, in which the first storage capacitor A 121 starts to be stored to a predetermined voltage. For example, the conversion efficiency of the DC/DC converter 130 is about 10% to 40% in the start-up mode or the cold start mode, and is about 70% to 90% in the main boost. In the following description, the voltage Va of the first storage capacitor A 121 at which the conversion efficiency of the DC/DC converter 130 becomes equal to or greater than a predetermined value is called as a voltage Vm for main boost.

Accordingly, in the power storage 100, the comparator 161 of the first switch selector 160 compares the detection signal Vf of the voltage Va of the first storage capacitor A 121 with the predetermined reference voltage Refm to determine whether or not the voltage Va of the first storage capacitor A 121 exceeds the voltage Vm for main boost. The reference voltage Refm corresponds to the voltage Vm (a threshold voltage) of the first storage capacitor A 121 and is used when determining whether or not the voltage Va of the first storage capacitor A 121 exceeds the voltage Vm for main boost.

In a case where the voltage Va of the first storage capacitor A 121 is equal to or less than the voltage Vm for main boost (in a case where the voltage Va is equal to or less than the reference voltage Refm), the first switch selector 160 sends the control signal CNT1 to the first switch 141 and brings the contact a and the contact c of the switch SW1 into a conduction state to allow direct power feed from the solar battery 110 to the first storage capacitor A 121. With this, the power storage efficiency is increased.

In a case where the voltage of the first storage capacitor A 121 exceeds the voltage Vm for main boost, the first switch selector 160 sends the control signal CNT1 to the first switch 141 and brings the contact b and the contact c of the switch SW1 into a conduction state to allow power feed from the solar battery 110 to the first storage capacitor A 121 through the DC/DC converter 130.

The second switch selector 170 includes a comparator 171, and the comparator 171 compares the storage capacity with a predetermined threshold. In this embodiment, a reference voltage Ref1 generated by a reference voltage generation circuit (not shown) is compare with the detection signal Vf of the voltage Va of the first storage capacitor A 121 input from the voltage detector 150, and with this, the storage capacity is compared with the predetermined threshold. The reference voltage Ref1 corresponds to a voltage V1 of the first storage capacitor A 121 and is used when determining whether or not the voltage Va of the first storage capacitor A 121 exceeds the voltage V1 for power feed to the second storage capacitor B 122.

The second switch selector 170 outputs a control signal CNT2 for bringing the switch SW2 of the second switch 142 into the on-state (closed state) or the off-state (open state) to the second switch 142 according to a comparison result in the comparator 171. The second switch 142 performs an opening/closing operation of the switch SW2 based on the control signal CNT2.

That is, in a case where the voltage Va of the first storage capacitor A 121 is less than the voltage V1 (reference voltage Ref1), the second switch selector 170 brings the switch SW2 of the second switch 142 into the off-state in response to the control signal CNT2 to disconnect between the first storage capacitor A 121 and the second storage capacitor B 122. With this, the generated electric power of the solar battery 110 is fed only to the first storage capacitor A 121 through the DC/DC converter 130.

In a case where the voltage Va of the first storage capacitor A 121 exceeds the voltage V1 ("voltage Va≥reference voltage Ref1"), the second switch selector 170 brings the switch SW2 into the on-state to connect the first storage capacitor A 121 and the second storage capacitor B 122 in parallel, power feed is performed to the second storage capacitor B 122 by electric charge stored in the first storage capacitor A 121 or both of the output electric power of the DC/DC converter 130 and the electric charge stored in the first storage capacitor A 121.

In addition, in this embodiment, in a case where "voltage Va≥reference voltage Ref1" (storage capacity≥first threshold), the control signal CNT2 is supplied to a first switcher 310 of the switching device 300, the operation of the first switcher 310 starts, and the first switcher 310 performs power feed to a controller 220C and sensors 211 to 213. The first switcher 310 will be described below.

When power feed is performed to the second storage capacitor B 122, since the output electric power of the DC/DC converter 130 is small, the first storage capacitor A 121 becomes a subject which performs power feed to the second storage capacitor B 122. For this reason, in the following description, a case where power feed to the second storage capacitor B 122 is performed from the first storage capacitor A 121 will be described.

The comparator 171 of the second switch selector 170 performs determination with hysteresis characteristics when comparing the magnitude relationship between the detection signal Vf of the voltage Va of the first storage capacitor A 121 and the reference voltage Ref1. That is, the comparator 171 determines that the voltage Va of the first storage capacitor A 121 decreases to the voltage V1 or less when the voltage Va decreases to a voltage V1' (=V1−ΔV) lower than the voltage V1 by a predetermined voltage ΔV after it is detected that the voltage Va of the first storage capacitor A 121 exceeds the voltage V1.

Accordingly, the second switch selector 170 detects that the voltage Va of the first storage capacitor A 121 exceeds the voltage V1, outputs the control signal CNT2 for bringing the switch SW2 into the on-state once, and then, continues to output the control signal CNT2 for bringing SW2 into the on-state until the voltage Va decreases to the voltage V1'.

The voltage V1' is set to a voltage higher than a voltage V0 capable of driving the environment monitor 210C (V1'>V0).

The supply circuit 180 is a circuit which causes electric power to be supplied from the second storage capacitor B 122 to the environment monitor 210C and does not supply electric power to the first storage capacitor A 121 in a case where a sufficient amount of electric charge is charged in the second storage capacitor B 122. For example, the supply circuit 180 can be constituted using a diode. That is, in a case where the second storage capacitor B 122 is already sufficiently charged, if the switch SW2 is brought into the off-state, the supply circuit 180 prevents electric power from being not supplied from the second storage capacitor B 122 to the environment monitor 210C.

Environment Monitor

The environment monitor 210C includes a controller 220C (transmission controller), a temperature sensor 211 (environment sensor) which measures the temperature in a room, such as an office, a humidity sensor 212 (environment sensor) which measures humidity in a room, an illuminance sensor 213 (illuminance detector, detector, acquisition sensor, environment sensor) which detects illuminance in a room, and a transmission unit 240A.

The temperature sensor 211, the humidity sensor 212, and the illuminance sensor 213 are constituted of a measurement instrument or a detector according to the use application of the sensor node 10. The temperature sensor 211, the humidity sensor 212, and the illuminance sensor 213 perform measurements under the control of the controller 220C and outputs information indicating the obtained measurement results to the controller 220C. The measurements by the temperature sensor 211, the humidity sensor 212, and the illuminance sensor 213 are performed according to the timing at which the transmission unit 240A performs wireless transmission. However, the invention is not limited thereto, and the measurements by the temperature sensor 211, the humidity sensor 212, and the illuminance sensor 213 may be constantly performed at the respective predetermined timing, and the measurement results may be stored.

Transmission Unit

The transmission unit 240A encodes and modulates the measurement results input from the controller 220C to generate a transmission signal and transmits the transmission signal to the monitoring center 20 through wireless communication, for example, periodically. Most of the power consumption in the environment monitor 210C is spent for transmission power when the transmission unit 240A performs wireless transmission. In this embodiment, although the transmission unit 240A does not a wireless reception function in order to reduce power consumption, the invention is not necessarily limited thereto, and in a desired case, the transmission unit 240A may include a reception function. In this embodiment, a second switcher 320 of the switching device 300 described below is connected to the transmission unit 240A through a feeder line DCL5, and the driving of the transmission unit 240A is controlled by the second switcher 320. Power supply to the transmission unit 240A is controlled by the second switcher 320 in order to reduce the power consumption in the transmission unit 240.

Controller

The controller 220C outputs information indicating the measurement results input from the temperature sensor 211, the humidity sensor 212, and the illuminance sensor 213 to the transmission unit 240A, and causes this information to be transmitted from the transmission unit 240A to the monitoring center 20 in a wireless manner. The first switcher 310 of the switching device 300 described below is connected to the controller 220C, and power supply to the controller 220C is controlled by the first switcher 310.

The controller 220C has a mode setter 230C. The controller 220C monitors the voltage Va (storage capacity) of the first storage capacitor A and a voltage Vb (storage capacity) of the second storage capacitor B through signal lines (not shown). When the voltage Vb reaches a predetermined voltage, the controller 220C starts the operation of the second switcher 320, and the second switcher 320 performs power feed to the transmission unit 240A. The controller 220C adjusts a signal output period (transmission time interval) of the transmission unit 240A according to the power storage residual amount of the voltage Va and the voltage Vb and the value (power generation amount) of the illuminance sensor 213.

Mode Setter

The mode setter 230C includes an illuminance determiner 231, a first voltage determiner 232A, and a second voltage determiner 232B.

The illuminance determiner 231 determines whether or not surrounding illuminance is equal to or greater than a predetermined threshold. That is, the illuminance determiner 231 determines whether or not surrounding illuminance is equal to or greater than the predetermined threshold, thereby determining whether or not the power generation amount of the solar battery 110 is equal to or greater than a predetermined power generation amount. In a case where it is determined that the power generation amount of the solar battery 110 does not reach the predetermined power generation amount, the controller 220C makes the transmission time interval of the transmission unit 240A longer than a reference set time according to the determination result of the illuminance determiner 231 to suppress energy consumption. Conversely, in a case where it is determined that the power generation amount of the solar battery 110 reaches the predetermined power generation amount, the controller 220C sets the transmission time interval of the transmission unit 240A to the reference set time according to the determination result of the illuminance determiner 231. The mode setter 230C sets a mode for changing the transmission interval time according to the storage capacity of the electricity storage 120. The controller 220C controls the transmission time interval in the transmission unit 240A according to the mode set by the mode setter 230C. With this, in the sensor node 10, it is possible to automatically optimize the energy revenue and expenditure balance between generated electric power and power consumption.

Illuminance Determiner

As shown in FIG. 2, the reason for using the illuminance sensor 213 is because, in solar photovoltaic generation or indoor photovoltaic generation, it is unavoidable that the power generation amount per unit time is deflected according to a daily time zone.

That is, the reason is because, if the transmission unit 240A performs wireless transmission of sensor information in a time zone where illuminance is low and the power generation amount is small at the same transmission time interval as a time zone where illuminance is high and the power generation amount is large, energy stored in the electricity storage 120 is used, and the function as the sensor node 10 stops. However, it is not preferable as a system that the transmission time interval is set at the timing at which the power generation amount is small since a lot of time is required for collecting sensor information even when the power generation amount is sufficient.

The threshold illuminance which is used when the illuminance determiner 231 determines whether or not the detected illuminance is equal to or greater than the predetermined threshold illuminance may be the same illuminance (without hysteresis characteristics) or may be different illuminance (with hysteresis characteristics). That is, the illuminance determiner 231 may determine that illuminance ilb decreases to illuminance ilk or less when the illuminance ilb decreases to illuminance ilk' (=ilk−Δil) lower than the illuminance ilk by predetermined amount of illuminance Δil after it is detected that the illuminance exceeds the threshold illuminance ilk.

The environment monitor 210C may transit to a sleep state in a state where wireless transmission is not performed from the transmission unit 240A, thereby reducing power consumption. For example, the environment monitor 210C is brought into the sleep state for T1 minutes and is returned again when T1 minutes have elapsed in a case where the transmission interval time is set to T1 minutes. When returned, the environment monitor 210C acquires information relating to temperature, humidity, and illuminance again and performs wireless transmission. That is, the environment monitor 210C may not perform acquisition of information relating temperature, humidity, and illuminance and wireless transmission.

In a case where the detected illuminance is less than the predetermined threshold illuminance, the controller 220C makes the subsequent transmission time interval (sleep time) of the transmission unit 240A longer than the reference set time, thereby suppressing energy consumption (expenditure) of power stored in the second storage capacitor B 122. Conversely, in a case where the detected illuminance is equal to or greater than the predetermined threshold illuminance, the controller 220C returns the subsequent transmission time interval (sleep time) of the transmission unit 240A to the reference set time and performs a stationary operation. In this way, the environment monitor 210C changes the transmission time interval based on the detected illuminance, that is, the detection result of the amount of energy generated by the solar battery 110 as a power generator, thereby automatically obtaining the energy revenue and expenditure balance. A specific example of an operation to obtain the energy revenue and expenditure balance will be described below.

In the sensor node 10, when the electricity storage 120 performs initial charging from an empty state, the environment monitor 210C is driven early with the voltage charged in the first storage capacitor A 121. For example, the sensor node 10 performs control such that communication is not performed until a predetermined residual amount is charged in the first storage capacitor A 121, after the predetermined residual amount is reached, the environment monitor 210C is driven with the voltage charged in the first storage capacitor A 121, and the environment monitor 210C can be activated earlier than when the environment monitor 210C is driven after the first storage capacitor A 121 is fully charged. In a case of initial charging for charging the second storage capacitor B 122, the sensor node 10 extends the transmission time interval without performing transmission in the transmission unit 240A, whereby it is possible to smoothly perform charging of the second storage capacitor B 122.

That is, in the environment monitor 210C, a state where the charged voltage is low without proceeding charging of the second storage capacitor B 122 is detected, and thus, it is possible to suppress power consumption by making the transmission time interval longer than the reference set time, and to allow smooth charging of the second storage capacitor B 122 from the solar battery 110.

In the sensor node 10 shown in FIG. 2, it is detected by the illuminance sensor 213 that the amount of energy generated by the solar battery 110 decreases, and thus, the illuminance determiner 231 extends the transmission time interval according to the detected result to reduce energy consumption. That is, in a state where the amount of generated energy decreases, if wireless transmission is performed at the same transmission time interval as the stationary operation in which the detected illuminance is equal to or greater than the predetermined amount of illuminance value, there is a possibility that the energy of the electricity storage 120 is used in a short period of time to the voltage, at which the environment monitor 210C stops functioning. In order to avoid the function stop of the environment monitor 210C, in a case where it is detected that the amount of generated energy decreases, the controller 220C extends the transmission time interval, thereby reducing energy consumption.

In the illuminance sensor 213, although the amount of generated energy is acquired, this embodiment is not limited thereto. The controller 220C may calculate the amount of energy generated by the solar battery 110 based on the output of the solar battery 110. As described below, an element which performs power generation is not limited to the solar battery 110, and may be an element which generates electric power using vibration, heat, electromagnetic waves, or the like. In this case, a sensor which acquires the amount of generated energy may be a sensor suitable for an element generating electric power. In this way, even in a case where an element other than the solar battery 110 is used, the controller 220C may calculate the amount of energy generated by each element based on a signal output from each element.

Voltage Determiner

In this embodiment, the transmission time interval is set based on information relating to the storage capacity of the first storage capacitor A 121 obtained by the first voltage determiner 232A and information relating to the storage capacity of the second storage capacitor B 122 obtained by the second voltage determiner 232B, as well as information relating to illuminance detected by the illuminance sensor 213.

Specifically, in the above-described sensor node 10 (FIG. 2), the transmission time interval is extended in a state where power generation is little, thereby extending the time for which the environment monitor 210C stops operating. However, in a case where control is performed only based on this condition, since there is a possibility that the expenditure of energy exceeds the revenue, consequently, there is a possibility that the environment monitor 210C stops functioning. Accordingly, in the sensor node 10, not only the illuminance sensor 213 but also the first voltage determiner 232A and the second voltage determiner 232I are further provided, and three determiners including the illuminance determiner 231, the first voltage determiner 232A, and the second voltage determiner 232B are monitored.

First Voltage Determiner

The first voltage determiner 232A determines whether or not the voltage Va of the first storage capacitor A 121 is equal to or greater than a predetermined threshold, thereby determining whether or not the storage capacity of the first storage capacitor A 121 is equal to or greater than a predetermined value. The mode setter 230C sets a mode for changing the transmission interval time according to the storage capacity of the electricity storage 120. The controller 220C controls the transmission time interval in the transmission unit 240A according to the mode set by the mode setter 230C. The details of mode setting in the mode setter 230C will be described below.

The threshold voltage which is used when the above-described first voltage determiner 232A determines whether or not the voltage Va of the first storage capacitor A 121 is equal to or greater than the predetermined threshold voltage may be the same voltage (without hysteresis characteristics) or may be a different voltage (with hysteresis characteristics). That is, the first voltage determiner 232A may determine that the voltage Va of the first storage capacitor A 121 decreases to a voltage Vj or less when the voltage Va decreases to a voltage Vj' lower than the voltage Vj by a predetermined voltage ΔV after it is detected that the voltage Va of the first storage capacitor A 121 exceeds the threshold voltage Vj.

Similarly to the environment monitor 210C (FIG. 2), in a state where wireless transmission is not performed from the transmission unit 240A, the environment monitor 210C transits to the sleep state, thereby reducing power consumption.

In a case where the voltage of the first storage capacitor A 121 is less than the predetermined threshold voltage, the controller 220C makes the transmission time interval of the transmission unit 240A longer than the reference set time, thereby suppressing energy consumption (expenditure) of electric power stored in the first storage capacitor A 121. Conversely, in a case where the charged voltage of the electricity storage 120 is equal to or greater than a predetermined threshold voltage, the controller 220C returns the transmission time interval of the transmission unit 240A to the reference set time and performs a stationary operation. In this way, the environment monitor 210C changes the transmission time interval based on the charged voltage of the first storage capacitor A 121, thereby automatically obtaining the energy revenue and expenditure balance. A specific example of an operation to obtain the energy revenue and expenditure balance will be described below.

Second Voltage Determiner

The second voltage determiner 232B determines whether or not the voltage Vb of the second storage capacitor B 122 is equal to or greater than a predetermined threshold voltage, thereby determining whether or not the storage capacity of the second storage capacitor B 122 is equal to or greater than a predetermined value. The mode setter 230C sets a mode for changing the transmission interval time according to the storage capacity of the electricity storage 120. The controller 220C controls the transmission time interval in the transmission unit 240A according to the mode set by the mode setter 230C. The details of mode setting in the mode setter 230C will be described below.

The threshold voltage which is used when the above-described second voltage determiner 232B determines whether or not the voltage Vb of the second storage capacitor B 122 is equal to or greater than the predetermined threshold voltage may be the same voltage (without hysteresis characteristics) or may be a different voltage (with hysteresis characteristics). That is, the second voltage determiner 232B may determine that the voltage Vb of the second storage capacitor B 122 decreases to a voltage Vk or less when the voltage Vb decreases to a voltage Vk' lower than the voltage Vk by a predetermined voltage ΔV after it is detected that the voltage Vb of the second storage capacitor B 122 exceeds the threshold voltage Vk.

Similarly to the environment monitor 210C (FIG. 2), in a state where wireless transmission is not performed from the transmission unit 240A, the environment monitor 210C transits to the sleep state, thereby reducing power consumption.

In a case where the voltage of the second storage capacitor B 122 is less than the predetermined threshold voltage, the controller 220C makes the transmission time interval of the transmission unit 240A longer than the reference set time, thereby suppressing energy consumption (expenditure) of electric power stored in the second storage capacitor B 122. Conversely, in a case where the charged voltage of the electricity storage 120 is equal to or greater than the predetermined threshold voltage, the controller 220C returns the transmission time interval of the transmission unit 240A to the reference set time and performs a stationary operation. In this way, the environment monitor 210C changes the transmission time interval based on the charged voltage of the second storage capacitor B 122, thereby automatically obtaining the energy revenue and expenditure balance. A specific example of an operation to obtain the energy revenue and expenditure balance will be described below.

The above-described transmission time interval is set based on a calculation expression described below.

That is, if the voltage which is used when the second voltage determiner 232B determines that voltage of the electricity storage 120 decreases is "Vc (V)", a function stop voltage at which the transmission unit 240A stops a transmission function is "V0 (V)", the capacity of the second storage capacitor B 122 with large capacity of the electricity storage 120 is "C (F)", the maximum duration of a non-power generation state of the solar battery 110 is "T (sec)", and the energy consumption per unit time in a case where the environment monitor 210C performs transmission at the maximum transmission time interval (minimum wireless transmission rate) is "P (W)", the following expression is obtained.

$$T \times P < (\tfrac{1}{2}) \times C \times (Vc^2) - (\tfrac{1}{2}) \times C \times (V0^2)$$

If the condition of this expression is satisfied, even in a case where the non-power generation state is continued for "T (sec)", the environment monitor 210C can cause the transmission unit 240A to transmit sensor information without stopping functioning.

The energy consumption "P (W)" per unit time becomes a value obtained by adding a value obtained by time-averaging the amount of energy required for transmission per unit time and the amount of energy required in the sleep state per unit time.

If the electricity storage 120 (the first storage capacitor A 121 and the second storage capacitor B 122) uses energy once, as described below, the charging efficiency when charging is performed from the DC/DC converter 130 to the electricity storage 120 significantly decreases in a region where the charged voltage (storage capacity) of the electricity storage 120 is low. For this reason, several tens of hours to several days are required until the electricity storage 120 reaches the charged voltage required for restarting the function of the environment monitor 210C. This means that the environment monitor 210C cannot collect sensor information over a long period of time, causing a significant problem in constituting a sensor node.

In order to avoid this problem, in the sensor node 10, the second voltage determiner 232B detects the charged voltage Vb (storage capacity) of the second storage capacitor B 122 in the electricity storage 120, and the controller 220C changes the transmission time interval according to the storage capacity of the second storage capacitor B 122. With this, the energy revenue and expenditure balance is automatically obtained, and the voltage of the electricity storage 120 is prevented from decreasing to the voltage, at which the environment monitor 210C stops functioning, or less.

In the sensor node 10 of this embodiment, illuminance (the amount of energy generated by the solar battery 110) is monitored by the illuminance determiner 231, the charged voltage Va (storage capacity) of the first storage capacitor A 121 is monitored by the first voltage determiner 232A, and the charged voltage Vb (storage capacity) of the second storage capacitor B 122 is monitored by the second voltage determiner 232B. The monitoring results of illuminance, the charged voltage Va (storage capacity) of the first storage capacitor A 121, and the charged voltage Vb (storage capacity) of the second storage capacitor B 122 are used, whereby it is possible to further adjust the transmission time interval in a stepwise manner. With this, it is possible to further extend the time until the environment monitor 210C reaches the function stop. The details will be described below.

Switching Device

The switching device 300 includes two switchers, that is, the first switcher 310 and the second switcher 320. The first switcher 310 is provided to be connected to the controller 220C, the temperature sensor 211, the humidity sensor 212, and the illuminance sensor 213 and performs power feed to the controller 220C and the sensors 211 to 213. The second switcher 320 is provided corresponding to the transmission unit 240A and performs power feed to the transmission unit 240A.

The first switcher 310 has an Enable terminal, a Vin terminal, and a Vout terminal. In the configuration of the first switcher 310, the control signal CNT2 output from the second switch selector 170 is input to the Enable terminal, the feeder line DCL1 is connected to the Vin terminal, and a feeder line DCL4 is connected to the Vout terminal. The feeder line DCL4 is connected to the controller 220C, the temperature sensor 211, the humidity sensor 212, and the illuminance sensor 213.

In a case where the second switch selector 170 determines that the storage capacity of the electricity storage 120 is equal to or greater than a first threshold, the first switcher 310 is brought into the on-state, and the first switcher 310 feeds a predetermined power supply voltage to the controller 220C and the sensors 211 to 213. In this embodiment, it is determined that "voltage Va≥reference voltage Ref1", whereby it is determined that the storage capacity of the electricity storage 120 is equal to or greater than the first threshold.

The second switcher 320 has an Enable terminal, a Vin terminal, and a Vout terminal. In the configuration of the second switcher 320, a control signal CNT3 output from the controller 220C is input to the Enable terminal, the feeder line DCL1 is connected to the Vin terminal, and the feeder line DCL5 is connected to the Vout terminal. That is, the second switcher 320 is connected to the transmission unit 240A through the feeder line DCL5.

The second switcher 320 reads the storage capacity of the electricity storage 120 from the controller 220C. In a case where the storage capacity of the electricity storage 120 exceeds a second threshold, the predetermined power supply voltage is fed to the transmission unit 240A. In this embodiment, the voltage Vb of the second storage capacitor B 122 is fed from the controller 220C. In a case where the voltage Vb exceeds a predetermined level, the predetermined power supply voltage is fed to the transmission unit 240A. In general, in the transmission unit which performs wireless communication, it is known that most of electric power is consumed. Accordingly, in a case where the voltage Vb which is the storage capacity of the electricity storage 120 is small, the second switcher 320 stops the function of the transmission unit 240A, the power consumption in the transmission unit 240A is reduced, and the power storage speed of the first storage capacitor A 121 and the second storage capacitor B 122 increases.

In this embodiment, although only the voltage Vb (storage capacity) of the second storage capacitor B 122 is read from the controller 220C, both of the voltage Va (storage capacity) of the capacitor A 121 and the voltage Vb (storage capacity) of the second storage capacitor B 122 may be read from the controller 220C.

Each of the first switcher 310 and the second switcher 320 has a switching function of switching the output voltage of the Vout terminal according to the signal input to the Enable terminal. Each of the first switcher 310 and the second switcher 320 has a function of performing voltage adjustment such that the voltage output from the Vout terminal becomes a predetermined voltage and outputting the voltage to each of the feeder lines DCL4 and DCL5, as well as this switching function. That is, each of the first switcher 310 and the second switcher 320 has a function of boosting and deboosting the voltage input to the Vin terminal. Each of the first switcher 310 and the second switcher 320 includes a DC/DC converter. With this, even in a case where the voltages required for the transmission unit 240A and the controller 220C are different from each other, it is possible to perform power supply with an appropriate voltage corresponding to each of the transmission unit 240A and the controller 220C. For this reason, it is not necessary to match the voltage of a unit requiring a low voltage of the transmission unit 240A and the controller 220C with the voltage of a unit requiring a high voltage of the transmission unit 240A and the controller 220C, and wasteful power consumption is eliminated.

Configuration and Operation of Power Storage 100

FIGS. 3A and 3B are explanatory views showing the outline of the solar battery 110 for use in the power storage 100 and a connection state of solar battery cells. As shown in a plan view of FIG. 3A, four solar battery cells including a solar battery cell A111, a solar battery cell B112, a solar battery cell C113, and a solar battery cell D114 are arranged in a planar shape on the light receiving surface side of the solar battery 110, and as shown in FIG. 3B, the four solar battery cells A111 to D114 are connected in series and are constituted such that a predetermined output voltage Vs is obtained.

Although the solar battery 110 shown in FIGS. 3A and 3B has the four solar battery cells connected in series, the number of solar battery cells connected in series is selected such that a voltage output to the DC/DC converter 130 becomes a voltage at which a boosting operation is performed in the DC/DC converter 130 with predetermined efficiency or more. For example, in a case where a solar battery cell is a low illuminance dye-sensitized solar battery, it is preferable that the number of solar battery cells connected in series is a minimum of, for example, three or more.

On the other hand, in a case where the solar battery 110 is used as an input power supply, in order to continuously drive the environment monitor 210C, it is necessary to store electric power for power consumption at night without illumination in the storage battery. In addition, in a case of considering the use in a room, such as an office, it is necessary to store electric power for power consumption on Saturdays, Sundays, and national holidays. Increasing electric power stored in the storage battery is coped with by a method of increasing the capacity of the storage battery or charging the storage battery to a high voltage; however, since a lot of time is required for charging the storage battery in all methods, the time until the environment monitor 210C can be driven is extended.

In the power storage 100 of this embodiment, in order to solve the above-described problem, the two kinds of the first storage capacitor A 121 and the second storage capacitor B 122 with different capacities and the switch as a switching mechanism are used.

Figure 5:
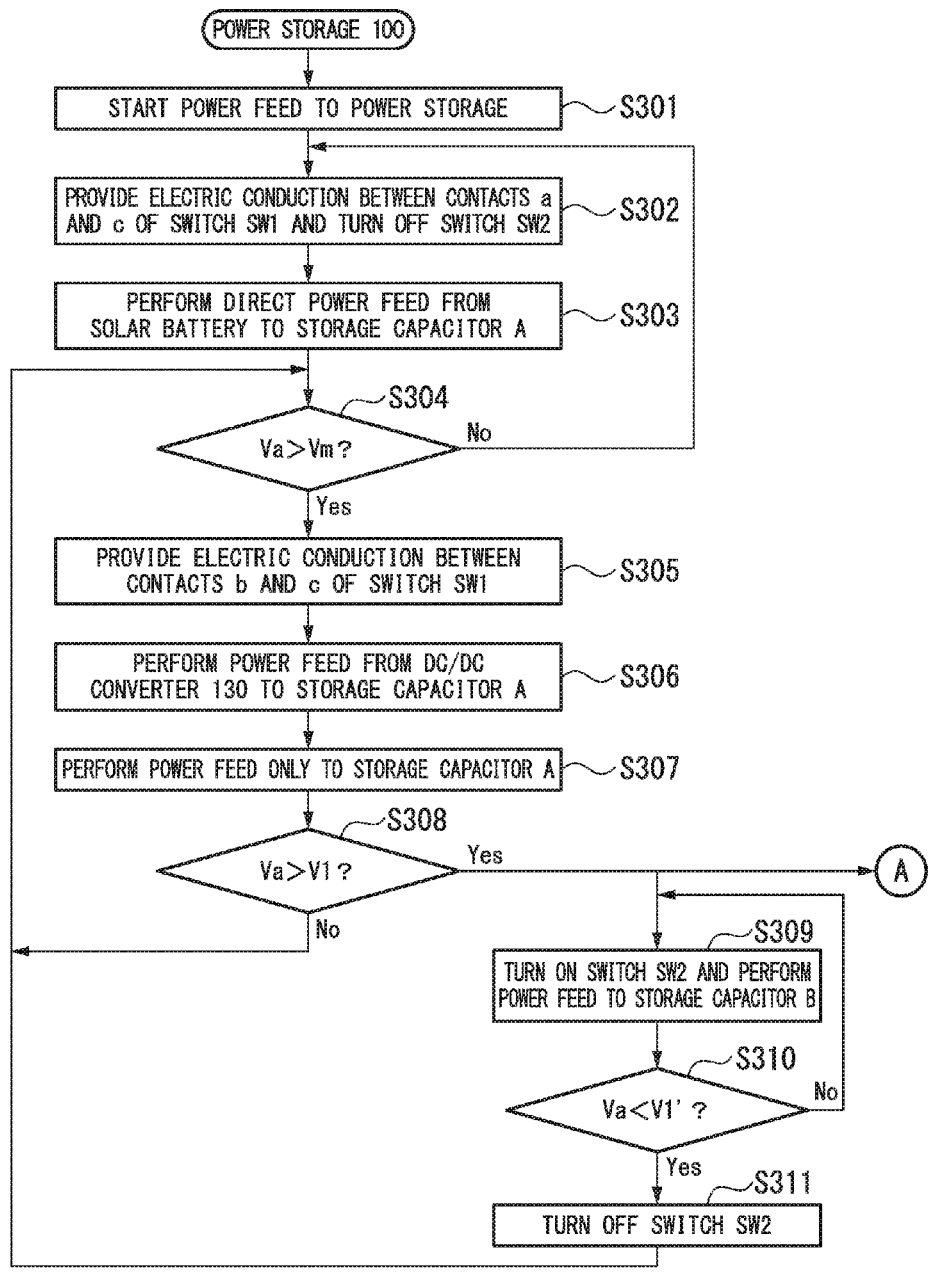
FIG. 5 is a flowchart showing the flow of processing in a power storage.
Figure 6:
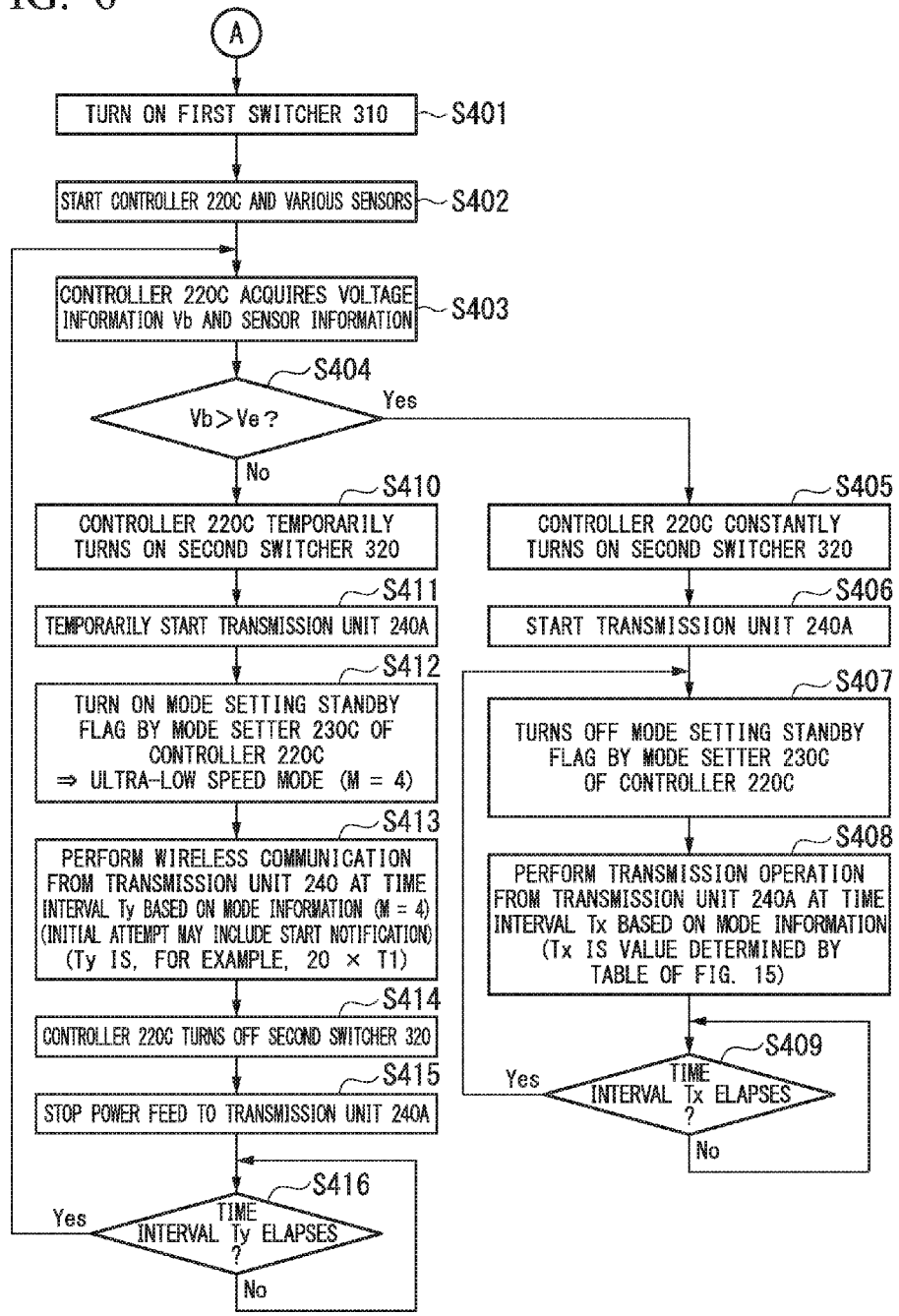
FIG. 6 is a flowchart showing the flow of processing in the power storage.

FIGS. 5 and 6 are flowcharts showing the flow of processing in the power storage 100. The flow of an operation in the above-described power storage 100 is shown in the flowcharts. Hereinafter, the flow of this processing will be described with reference to FIGS. 5 and 6.

First, it is assumed that the first storage capacitor A 121 and the second storage capacitor B 122 are in an uncharged state. In the power storage 100, if the charging operation is started (Step S301), initially, the first switch selector 160 sends the control signal CNT1 to the first switch 141 and brings the contact a and the contact c of the switch SW1 of the first switch 141 into a conduction state. The second switch selector 170 sends the control signal CNT2 to the second switch 142 and brings the switch SW2 into the off-state (Step S302). With this, the first switch selector 160 starts direct power feed from the solar battery 110 to the first storage capacitor A 121 (Step S303). Electric conduction is provided between the contact a and the contact c of the switch SW1 of the first switch 141, whereby electric power is supplied from the solar battery 110 to the first switcher 310 through the feeder line DCL1. That is, if there is a case where electric power is supplied from the solar battery 110 to the first switcher 310 and the second switcher 320 without passing through the DC/DC converter 130, there is also a case where electric power is supplied from at least one of the first storage capacitor A 121 and the second storage capacitor B 122 to the first switcher 310 and the second switcher 320 without passing through the DC/DC converter 130. However, since control signal CNT2 is not supplied to the Enable terminal of the first switcher 310, the first switcher 310 is brought into the off-state. Since the control signal CNT3 is not supplied to the Enable terminal of the second switcher 320, the second switcher 320 is brought into the off-state.

Subsequently, in Step S303, power feed to the first storage capacitor A 121 starts, whereby the voltage Va of the first storage capacitor A 121 (the same voltage as that of feeder line DCL1) gradually increases. Subsequently, the comparator 161 of the first switch selector 160 determines whether or not the voltage Va of the first storage capacitor A 121 exceeds the voltage Vm for main boost in the DC/DC converter 130 (Step S304).

In Step S304, in a case where it is determined that the voltage Va of the first storage capacitor A 121 does not exceed the voltage Vm (Step S304: No), the process returns to Step S302, the first switch selector 160 brings the contact a and the contact c of the switch SW1 of the first switch 141 into a conduction state, brings the contact b and the contact c into a non-conduction state, and continues direct power feed from the solar battery 110 to the first storage capacitor A 121.

Subsequently, the charging of the first storage capacitor A 121 proceeds, the voltage Va of the first storage capacitor A 121 increases, in Step S304, in a case where it is determined that the voltage Va of the first storage capacitor A 121 exceeds the voltage Vm (Step S304: Yes), the process progresses to Step S305, the first switch selector 160 brings the contact a and the contact c of the switch SW1 of the first switch 141 into a non-conduction state, and brings the contact b and the contact c into a conduction state (Step S305). With this, the first switch selector 160 allows power feed from the DC/DC converter 130 to the first storage capacitor A 121 (Step S306). The contact b and the contact c of the switch SW of the first switch 141 are brought into a conduction state, whereby electric power is supplied from the DC/DC converter 130 to the first switcher 310 through the feeder line DCL1. However, since the control signal CNT2 is not supplied to the Enable terminal of the first switcher 310, the first switcher 310 is brought into the off-state.

Subsequently, power feed is performed from the DC/DC converter 130 to the first storage capacitor A 121, whereby the voltage Va of the first storage capacitor A 121 increases (Step S307). The comparator 171 of the second switch selector 170 determines whether or not the voltage Va of the first storage capacitor A 121 exceeds the voltage V1 (first threshold) for power feed to the second storage capacitor B 122 (Step S308).

In Step S308, in a case where it is determined that the voltage Va of the first storage capacitor A 121 exceeds the voltage V1 (Step S308: Yes), the process progresses to Steps S309 and S401 (in FIG. 5, symbol A, sec FIG. 6 described below). The processing of Step S309 and the processing of Step S401 are simultaneously performed. In Step S309, the second switch selector 170 brings the switch SW2 of the second switch 142 into the on-state to start power feed from the first storage capacitor A 121 to the second storage capacitor B 122. Power feed is performed from the first storage capacitor A 121 to the second storage capacitor B 122, whereby the voltage Va of the first storage capacitor A 121 decreases.

In Step S308, in a case where it is determined that the voltage Va of the first storage capacitor A 121 does not exceed the voltage V1 (Step S308: No), the process returns to Step S304.

Subsequently, the comparator 171 of the second switch selector 170 determines whether or not the voltage Va of the first storage capacitor A 121 decreases to less than the voltage V1'(=V1−ΔV) (Step S310).

In Step S310, in a case where it is determined that the voltage Va of the first storage capacitor A 121 does not decrease to less than the voltage V1' (Step S310: No), the second switch selector 170 returns to the processing of Step S309 and continues power feed from the first storage capacitor A 121 to the second storage capacitor B 122.

In Step S310, in a case where the voltage Va of the first storage capacitor A 121 decreases to less than the voltage V1' (Step S310: Yes), the second switch selector 170 brings the switch SW2 of the second switch 142 into the off-state and stops power feed from the first storage capacitor A 121 to the second storage capacitor B 122 (Step S311). After the processing of Step S311 is executed, the process returns to Step S304 again and the comparator 161 of the first switch selector 160 determines whether or not the voltage Va of the first storage capacitor A 121 exceeds the voltage Vm for main boost in the DC/DC converter 130.

Next, the processing after Step S401 will be described with reference to FIG. 6.

In a case where it is determined that the voltage Va of the first storage capacitor A 121 exceeds the voltage V1 (Step S308: Yes), the second switch selector 170 sends the control signal CNT2 to the second switch 142 and supplies the control signal CNT2 to the Enable terminal of the first switcher 310. The first switcher 310 is brought into the on-state (Step S401).

For example, in a case where the solar battery 110 as an environmental power generator restarts power generation, or the like, there is a case where the storage capacity of the power storage 100 increases after the storage capacity of the power storage 100 decreases to the voltage V1 (first threshold) or less. In this case, when the storage capacity of the power storage 100 reaches the voltage V1, the power storage 100 brings the first switcher 310 into the on-state.

If the residual amount of the first storage capacitor A 121 exceeds the activation start voltage (V1) of the first switcher 310 (Step S308: Yes), there are a case where the first switcher 310 functions as a DC/DC boost converter and a case where the first switcher 310 functions as a DC/DC deboost converter. In a case where the voltage of the Vin terminal of the first switcher 310 is lower than the voltage of the Vout terminal (strictly, Vout+α), the first switcher 310 functions as a boost converter. In a case where the voltage of the Vin terminal is greater than the voltage of the Vout terminal (strictly, Vout+α), the first switcher 310 operates as a DC/DC deboost converter.

In Step S305 described above, since the contact b and the contact c are brought into a conduction state, electric power is supplied from the DC/DC converter 130 to the first switcher 310 through the feeder line DCL1 connected to the Vin terminal of the first switcher 310 (before electric power is supplied from the DC/DC converter 130 to the first switcher 310, electric power is supplied from at least one of the solar battery 110, the first storage capacitor B 121, and the second storage capacitor B 122 to the first switcher 310 without passing through the DC/DC converter 130). For this reason, the first switcher 310 is brought into the on-state, whereby electric power supplied from the first switcher 310 is output to the feeder line DCL4 through the Vout terminal of the first switcher 310. As a result, the electric power of the first switcher 310 is supplied to the controller 220C, the temperature sensor 211, the humidity sensor 212, and the illuminance sensor 213 (Step S402). The controller 220C acquires voltage information Vb and further acquires sensor information from the temperature sensor 211, the humidity sensor 212, and the illuminance sensor 213.

Subsequently, the controller 220C determines whether or not the voltage Vb of the second storage capacitor B 122 exceeds a voltage Ve (second threshold) (Step S404).

Step S404: No

In Step S404, in a case where it is determined that the voltage Vb of the second storage capacitor B 122 does not exceed the voltage Ve (Step S404: No), the controller 220C temporarily brings the second switcher 320 into the on-state (Step S410). Specifically, the controller 220C temporarily outputs the control signal CNT3, the control signal CNT3 is input to the Enable terminal of the second switcher 320, and the second switcher 320 is temporarily brought into the on-state.

In Step S305 described above, since the contact b and the contact c are brought into a conduction state, electric power is supplied from the DC/DC converter 130 to the second switcher 320 through the feeder line DCL1 connected to the Vin terminal of the second switcher 320. (Before electric power is supplied from the DC/DC converter 130 to the second switcher 320, electric power is supplied from at least one of the solar battery 110, the first storage capacitor B 121, and the second storage capacitor B 122 to the second switcher 320 without passing through the DC/DC converter 130). For this reason, the second switcher 320 is brought into the on-state, whereby electric power supplied to the second switcher 320 is output to the feeder line DCL5 through the Vout terminal of the second switcher 320. As a result, the electric power of the second switcher 320 is supplied to the transmission unit 240A. Since the second switcher 320 is temporarily brought into the on-state, the transmission unit 240A is also temporarily activated (Step S411).

Subsequently, in the mode setter 230C of the controller 220C, mode setting is performed, a standby flag is "ON", and a mode value M is set to "M=4" (ultra-low speed mode) (Step S412, and Steps S100 and S110 described below). The flow of mode setting processing in the mode setter 230C will be described below.

Next, the transmission unit 240A performs wireless transmission at a time interval Ty (Ty is, for example, 20×T1) based on mode information (M=4) (Step S413). In Step S413, at the time of initial communication through the transmission unit 240A, the transmission unit 240A transmits communication information including an activation notification (information for giving a notification to the effect that the transmission unit 240A is activated or information for giving a notification to the effect that the power storage 100 is restored).

Subsequently, the controller 220C brings the second switcher 320 into the off-state (Step S414). Specifically, the controller 220C stops the output of the control signal CNT3 to the Enable terminal of the second switcher 320. If the second switcher 320 is brought into the off-state, power supply to the transmission unit 240A stops (Step S415).

Next, after power supply to the transmission unit 240A stops, the controller 220C determines whether or not the time interval Ty has elapsed (Step S416).

In Step S416, in a case where it is determined that the time interval Ty has elapsed (Step S416: Yes), the process progresses to Step S403.

In a case where it is determined that the time interval Ty has not elapsed (Step S416: No), the determination in Step S416 is performed. With this, it is possible to transmit sensor information and the like even in the ultra-low speed mode.

Step S404: Yes

In Step S404, in a case where it is determined that voltage Vb (storage capacity) of the second storage capacitor B 122 exceeds the voltage Ve (second threshold) (Step S404: Yes), the controller 220C constantly brings the second switcher 320 into the on-state (Step S405). Specifically, the controller 220C constantly outputs the control signal CNT3, the control signal CNT3 is input to the Enable terminal of the second switcher 320, and the second switcher 320 is constantly brought into the on-state. Both of the voltage Va (storage capacity) of the first storage capacitor A 121 and the voltage Vb of the second storage capacitor B 122 may be detected, and it may be determined whether or not the detected voltages exceed the threshold.

In Step S305 described above, since the contact b and the contact c are brought into the conduction state, electric power is supplied from the DC/DC converter 130 to the second switcher 320 through the feeder line DCL1 connected to the Vin terminal of the second switcher 320. For this reason, the second switcher 320 is brought into the on-state, whereby electric power supplied to the second switcher 320 is output to the feeder line DCL5 through the Vout terminal of the second switcher 320. As a result, the electric power of the second switcher 320 is supplied to the transmission unit 240A. Since the second switcher 320 is constantly brought into the on-state, the transmission unit 240A is also activated (Step S406). In Step S406, in a period during which wireless transmission is performed by the transmission unit 240A, the activation notification (information giving a notification to the effect that the transmission unit 240A is activated) may be included in the communication information.

Subsequently, in the mode setter 230C of the controller 220C, mode setting is performed, and the standby flag is "OFF" (Step S407, and Steps S100 and S101 described below). The flow of mode setting processing in the mode setter 230C will be described below.

Next, a transmission operation by the transmission unit 240A is performed at a time interval Tx based on mode information (Step S408). The time interval Tx is a time interval which is determined based on a table shown in FIG. 8A described below.

Next, the controller 220C determines whether or not the time interval Tx has elapsed after the transmission operation by the transmission unit 240A (Step S409).

In Step S409, in a case where it is determined that the time interval Tx has elapsed (Step S409: Yes), the process progresses to Step S407.

In a case where it is determined that the time interval Tx has not elapsed (Step S409: No), the determination in Step S409 is performed.

The flow of the above-described processing is the flow of processing in which power feed is performed from a state where the first storage capacitor A 121 and the second storage capacitor B 122 are uncharged. In regard to the flow of processing in a case where power generation is not performed from the charged state were the storage capacity of the electricity storage 120 is equal to or greater than the second threshold and decreases to the second threshold or less, a reverse operation to the flow of the above-described processing may be performed. First, in a case where the voltage Vb (storage capacity) of the second storage capacitor B 122 is equal to or less than the voltage Ve (second threshold), the controller 220C of the electricity storage 120 determines whether or not the voltage Vb (storage capacity) of the second storage capacitor B 122 reaches a third threshold equal to or less than the second threshold and greater than the first threshold. In a case where the voltage Vb is equal to or less than the third threshold, the second switcher 320 is brought into the off-state and the second switcher 320 shuts off the supply of electric power to the transmission unit 240A.

Next, it is determined whether or not the voltage Va (storage capacity) of the first storage capacitor A 121 reaches a fourth threshold equal to or less than the first threshold. In a case where the voltage Va is equal to or less than the fourth threshold, the first switcher 320 is brought into the off-state, and the first switcher 320 shuts off the supply of electric power to the controller 220C, the temperature sensor 211, the humidity sensor 212, and the illuminance sensor 213. With this, in a case where the storage capacity of the electricity storage 120 is small, it is possible to suppress wasteful power consumption.

A fifth threshold which is greater than the second threshold may be set. In this case, in a case where the storage capacity of the electricity storage 120 is equal to or less than fifth threshold and greater than the third threshold, the transmission unit 240A may transmit attention information. The attention information is information for giving a notification to the effect that transmission may not be performed hereafter when the storage capacity of the power storage 100 is equal to or less than a given voltage.

The second threshold, the third threshold, and the fourth threshold described above may be stored in a storage (memory) provided in the power storage 100 or may be stored in a storage (memory) provided in the controller 220C. The fifth threshold is stored in the storage (memory) provided in the controller 220C. The first threshold is stored in the storage (memory) provided in the power storage 100.

With the flow of the above-described processing, in the power storage 100, direct power feed is performed from the solar battery 110 to the first storage capacitor A 121 until the voltage Va of the first storage capacitor A 121 reaches the voltage Vm for main boost, and if the voltage Va of the first storage capacitor A 121 exceeds the voltage Vm for main boost, power feed can be performed from the solar battery 110 to the first storage capacitor A 121 through the DC/DC converter 130. That is, in the power storage 100, when power feed is performed to the first storage capacitor A 121 in a state where the charged voltage is low, it is possible to perform power feed without being affected by a conversion loss at the time of voltage boosting by the DC/DC converter. For this reason, in a case where the voltage Va charged in the first storage capacitor A 121 is low, it is possible to shorten the charging time of the first storage capacitor A 121.

The power storage 100 charges the first storage capacitor A 121 with small capacity ahead, whereby, even in a case where the storage capacitor with large capacity is used, it is possible to quickly increase the voltage output to the environment monitor 210C through the first switcher 310. In the power storage 100, it is possible to proceed the charging of the second storage capacitor B 122 while driving the environment monitor 210C through the first switcher 310.

Since the power storage 100 includes the first switcher 310 which controls power supply to the controller 220C and the sensors 211, 212, and 213, electric power is not constantly supplied to the controller 220C and the sensors 211, 212, and 213, and only in a case where the first switcher 310 is in the on-state, electric power is supplied to the controller 220C and the sensors 211, 212, and 213. For this reason, it is possible to reduce the power consumption in the controller 220C and the sensors 211, 212, and 213.

Since the power storage 100 includes the second switcher 320 which controls power supply to the transmission unit 240A, electric power is not constantly supplied to the transmission unit 240A, and only in a case where the second switcher 320 is in the on-state, electric power is supplied to the transmission unit 240A. For this reason, it is possible to reduce the power consumption in the controller 220C and the sensors 211, 212, and 213.

The second switcher 320 is provided, whereby it is possible to prevent wasteful power consumption in the transmission controller 240A in a case where the transmission controller 240A is not activated (a period from when a power supply is supplied to the transmission controller 240A until the transmission controller 240A is activated or a period during which the sensors 211, 212, and 213 acquire sensor information). In particular, as described above, in a case where an environmental power generator is used in a sensor node, it is necessary to drive a sensor node with little electric power. For this reason, the first switcher 310 and the second switcher 320 largely contribute to reduction in power consumption in the sensor node.

According to the sensor node 10 of this embodiment, it is possible to achieve a battery-less structure. In addition, it is possible to quickly recover the sensor node 10 even in a case where the energy revenue and expenditure balance between the power generation amount and the power consumption collapses.

FIG. 7A is an explanatory view showing an image of change in voltage in each of the first storage capacitor A 121 and the second storage capacitor B 122. In FIG. 7A, the horizontal axis indicates the lapse of time t, and the vertical axis indicates a voltage (V). FIG. 7A shows a mode of temporal change in the voltage Va of the first storage capacitor A 121 and a mode of temporal change in the voltage Vb of the second storage capacitor B 122.

At the time t0 of FIG. 7A, it is assumed that the first storage capacitor A 121 and the second storage capacitor B 122 are in an uncharged state. At the time t0, the charging of the electricity storage 120 from the solar battery 110 is started. At the time of the start of charging at the time t0, the first switch selector 160 sends the control signal CNT1 to the first switch 141 and brings the contact a and the contact c of the switch SW1 of the first switch 141 into a conduction state. The second switch selector 170 sends the control signal CNT2 to the first switch 141 and brings the switch SW2 into the off-state. With this, power feed is readily started from the solar battery 110 to the first storage capacitor A 121.

Power feed is started from the solar battery 110 to the first storage capacitor A 121, whereby the voltage Va of the first storage capacitor A 121 gradually increases after the time t0. At the time t1 after the time t0, the voltage Va of the first storage capacitor A 121 reaches the voltage Vm for main boost in the DC/DC converter 130. At the time t1, if the voltage Va of the first storage capacitor A 121 reaches the voltage Vm for main boost, the first switch selector 160 brings the contact a and the contact c of the switch SW1 of the first switch 141 into a non-conduction state and brings the contact b and the contact c into a conduction state. With this, after the time t1, the first switch selector 160 allows power feed from the DC/DC converter 130 to the first storage capacitor A 121.

Subsequently, after the time t1, the voltage Va of the first storage capacitor A 121 gradually increases, and at the time t2 after the time t1, the voltage V0 capable of driving the environment monitor 210C is reached, the environment monitor 210C is activated.

At the time t2, if the time t3 after the environment monitor 210C is activated is reached and the voltage Va of the first storage capacitor A 121 increases to the voltage V1, at the time t3, the second switch selector 170 brings the switch SW2 of the second switch 142 into the on-state and performs power feed to the second storage capacitor B 122 with electric charge stored in the first storage capacitor A 121.

In a case of performing power feed from the first storage capacitor A 121 to the second storage capacitor B 122, it is assumed that the voltage Va of the first storage capacitor A 121 decreases to a voltage at which the first storage capacitor A 121 and the second storage capacitor B 122 become balanced. For this reason, the second switch selector 170 brings the switch SW2 into the off-state before the voltage Va of the first storage capacitor A 121 falls below the voltage V0 capable of driving the environment monitor 210C, that is, in a case where the voltage of the first storage capacitor A 121 decreases to the voltage V1' (V1>V1'>V0), the second storage capacitor B 122 is disconnected from the first storage capacitor A 121. After the switch SW2 is brought into the off-state, in a case where the voltage Va of the first storage capacitor A 121 exceeds the voltage V1 again, the second switch selector 170 brings the switch SW2 into the on-state again and performs power feed from the first storage capacitor A 121 to the second storage capacitor B 122. That is, the second switch selector 170 performs power feed from the first storage capacitor A 121 to the second storage capacitor B 122 while repeating the switching operation of the on-state or the off-state of the switch SW2. For this reason, the voltage Va of the first storage capacitor A 121 becomes a voltage which fluctuates between the voltage V1 and the voltage V1' as shown in a portion E surrounded by a broken line of FIG. 7A on an enlarged scale, that is, as shown in FIG. 7B.

After the time t3, the charging of the second storage capacitor B 122 proceeds, and the voltage Vb of the second storage capacitor B 122 gradually increases.

If the time t4 after the time t3 is reached, charging is performed until the voltage Vb of the second storage capacitor B 122 becomes substantially equal to the voltage of the first storage capacitor A 121.

If the voltages of the first storage capacitor A 121 and the second storage capacitor B 122 become a voltage Vsat, the DC/DC converter 130 stops the output in order to prevent overcharging of the first storage capacitor A 121 and the second storage capacitor B 122, and thus, stops power feed to the first storage capacitor A 121 and the second storage capacitor B 122.

In this way, the power storage 100 charges the first storage capacitor A 121 with small capacity ahead, whereby it is possible to quickly increase the voltage output to the environment monitor 210C even in a case where the storage capacitor with large capacity is used. In the power storage 100, it is possible to proceed the charging of the second storage capacitor B 122 while driving the environment monitor 210C.

The sensor node 10 of this embodiment is, for example, a sensor node which is installed in a room, such as an office, and electric power is supplied to the power storage 100 by solar or indoor photovoltaic generation and is stored. On the other hand, in a case where a dark state is maintained outdoors over a long period of time (for example, in a case where nobody visits a room over a long period of time due to a long-term business trip or the like), the residual amounts of the first storage capacitors A 121 and B 122 decrease to less than the voltage V1. The residual amounts of the first storage capacitors A 121 and B 122 may become zero. In this case, in order to advance the restart operation (the start of wireless transmission), the sensor node 10 can be activated only by the first storage capacitor A 121 with small capacity. That is, it is possible to quickly recover the sensor node 10 from a state where energy revenue and expenditure collapse to a normal activation state even in a case where the above-described energy revenue and expenditure collapse.

The above-described first threshold (voltage V1) is a threshold which is used to determine the storage capacity of the electricity storage 120. If the voltage Va (storage capacity) of the electricity storage 120 exceeds the first threshold, the controller 220C and the sensors 211 to 213 start to operate. The first threshold is stored in an external circuit part (second switch selector 170) of the controller 220C. In this embodiment, for convenience, although the first threshold is the same as a switching voltage (storage capacity) for switching SW2, as the first threshold, a different voltage (storage capacity) may be set. However, as the first threshold, it is necessary to select a voltage (storage capacity) such that wireless transmission can be performed several times.

The first threshold is the same as the switching voltage (storage capacity) for switching SW2, whereby it is not necessary to provide a plurality of comparators and thus power consumption is reduced.

In this embodiment, if the voltage Va of the first storage capacitor A 121 exceeds the first threshold, the controller 220C and the sensors 211 to 213 are activated. For this reason, it is possible to recognize the state of the sensor node. In a case where the voltage Va of the first storage capacitor A 121 falls below the first threshold, power storage in the capacitor A is performed with priority without performing power feed to the controller 220C and the sensors 211 to 213. In this case, in a transmission unit (wireless module) with large power consumption, wireless transmission in the "ultra-low speed mode (standby mode)" is performed. Specifically, information for giving a notification to the effect that the system is activated and minimum sensor information are transmitted in a wireless manner. The transmission interval of the sensor information is longer than the transmission interval in Mode0, Mode1, and Mode2. In wireless transmission other than the wireless transmission in the ultra-low speed mode (standby mode), power feed to the transmission unit 240A stops (the second switcher 320 in a Disable state), and accordingly, the power storage characteristics of the capacitor A can be improved.

With the determination function of the controller 220C, the residual amount Vb (storage capacity) of the second storage capacitor B 122 is compared with the voltage (storage capacity) of the second threshold by the second voltage determiner 232B, and in a case where the voltage Vb (storage capacity) is lower than the "second threshold (Ve)", "the ultra-low speed mode (standby mode)" is maintained. In a case where the residual amount Vb (storage capacity) of the second storage capacitor B 122 exceeds the second threshold, the control signal CNT3 is supplied to the Enable terminal of the second switcher 320, the second switcher 320 is brought into an Enable state, and the second switcher 320 supplies electric power to the transmission unit 240A.

Details of Operation of Environment Monitor 210C

As described above, in the environment monitor 210C, the mode setter 230C in the controller 220C sets the transmission time interval for wireless transmission in the transmission unit 240A based on the power generation amount of the solar battery 110 or based on the power generation amount of the solar battery 110 and the storage capacity of the second storage capacitor B 122. The setting of the transmission time interval is performed in the four modes.

FIGS. 8A to 8C are explanatory views showing the types of modes for setting the transmission time interval, and the transmission time interval (for example, the time in units of minutes) corresponding to each mode is shown in a table. As shown in the table of FIG. 8A, the modes which are set by the mode setter 230C are four modes of Mode0, Mode1, Mode2, and Mode4.

Mode0 is a mode of a stationary state in which the transmission unit 240A performs transmission at each reference set time, and a mode in which the transmission unit 240A performs wireless transmission at each set time (reference time) to be a reference. Mode1 is a mode in which the transmission unit 240A performs wireless transmission at a time interval two times the reference set time. Mode2 is a mode in which the transmission unit 240A performs wireless transmission at a time interval ten times the reference set time. Mode4 is a mode in which the transmission unit 240A performs wireless transmission at a time interval 20 times the reference set time (ultra-low speed mode).

For example, in a case where the reference set time is set to T1, in Mode0, the transmission unit 240A performs transmission at a time interval of T1, in Mode1, the transmission unit 240A performs transmission at a time interval of 2×T1, and in Mode2, the transmission unit 240A performs transmission at a time interval of 10×T1. In Mode4, the transmission unit 240A performs transmission at a time interval of 20×T1. The same applies to a case where the reference set time is set to T2, T3, and T4.

The reference set time is set by a user or an operator with a setting device, such a dual in-line package switch (DIP switch), provided in the environment monitor 210C before the start of the operation. For example, if the reference set time is set to T1, the time interval in Mode0 becomes T1 minutes, the time interval in Mode1 becomes 2×T1 minutes, and the time interval in Mode2 becomes 10×T1 minutes. The setting is determined according to a situation in which the user uses the sensor node 10 or 10a.

In the example shown in FIG. 8A, although an example where the four modes (Mode0, Mode1, Mode2, and Mode4) are set has been shown, the types of modes to be set may be two, or five or more.

Mode Setting Processing

Figure 9:
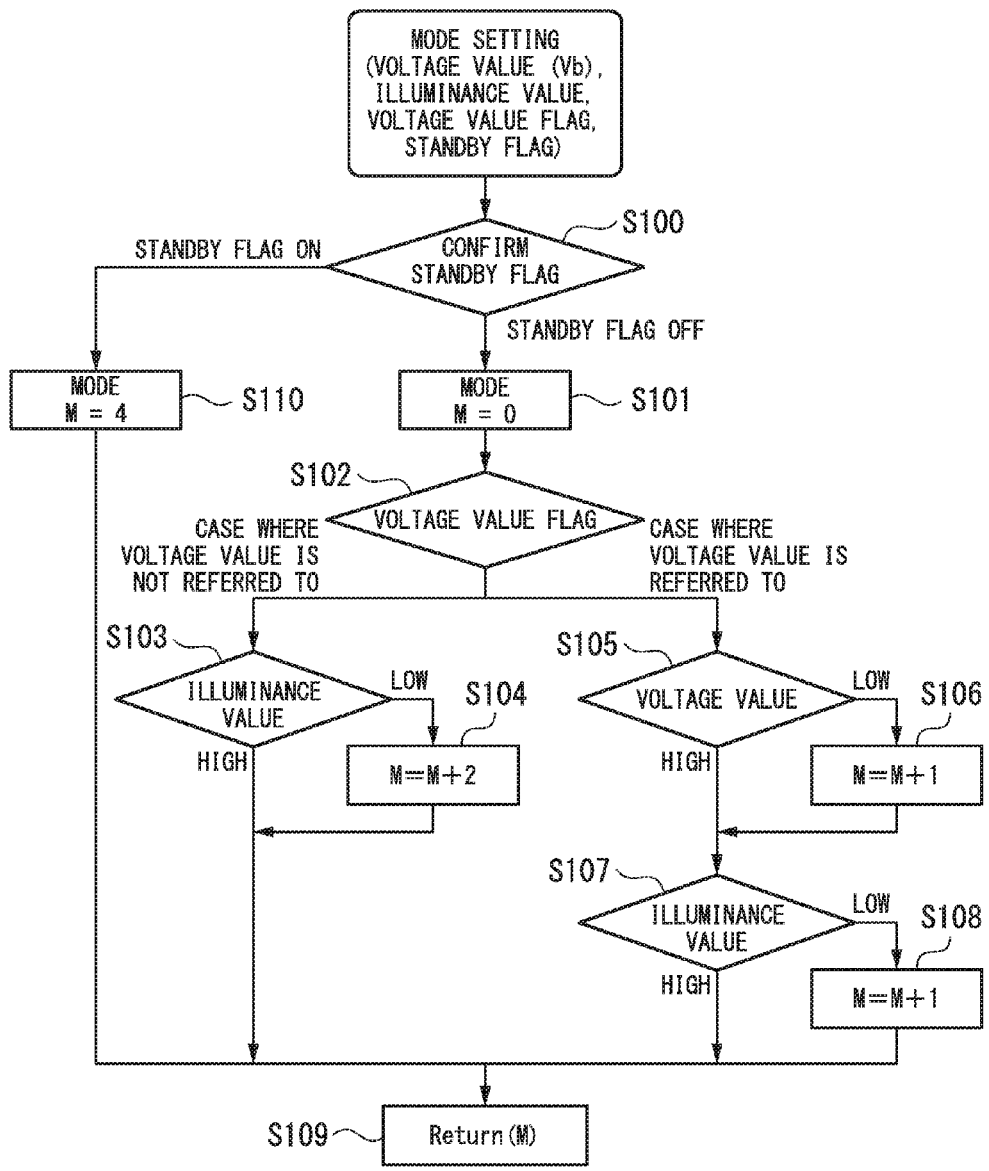
FIG. 9 is a flowchart showing the flow of mode setting processing.

FIG. 9 is a flowchart showing the flow of the mode setting processing. The example shown in FIG. 9 shows the flow of processing which is performed by a function "mode setting ( )" for setting a mode in the mode setter 230C. This processing is performed when the environment monitor 210C is returned from the sleep state, that is, at each transmission time interval. The function "mode setting ( )" uses, as arguments, the voltage value of the second storage capacitor B 122, the illuminance value detected by the illuminance sensor 213, a voltage value flag indicating the presence or absence of the voltage value of the second storage capacitor B 122, and the standby flag, and generates the value M indicating the type of mode as a return value. In regard to the value of M indicating the type, M=0 corresponds to Mode0, M=1 corresponds to Mode1, M=2 corresponds to Mode2, and M=4 corresponds to Mode4.

The voltage value to be the argument of the function "mode setting ( )" is determined by the voltage of the second storage capacitor B 122. The second voltage determiner 232B sets the voltage value as a logic "High" in a case where the voltage Vb of the second storage capacitor B 122 is equal to or greater than a predetermined threshold voltage value, and sets the voltage value as a logic "Low" in a case where the voltage Vb of the second storage capacitor B 122 is less than the predetermined threshold voltage value. In a case where the voltage value of the second storage capacitor B 122 cannot be detected, the second voltage determiner 232B sets the voltage value as a logic "High".

The illuminance value to be the argument of the function "mode setting ( )" is determined by the illuminance determiner 231. The illuminance determiner 231 sets the illuminance value as a logic "High" in a case where illuminance is equal to or greater than a predetermined threshold, and sets the illuminance value as a logic "Low" in a case where illuminance is less than the predetermined threshold. In a case where the illuminance value cannot be detected, the illuminance determiner 231 sets the illuminance value as a logic "High".

Hereinafter, the flow of this processing will be described with reference to FIG. 9.

If the mode setting processing is started, it is confirmed whether the standby flag is "ON" or "OFF" (Step S100). The standby flag is set to "ON" in Step S412 described above, and is set to "OFF" in Step S407 described above. In a case where the standby flag is "ON", the mode setter 230C initially the mode value M to "M=4" in the function "mode setting ( )" (Step S110). The mode setter 230C progresses to Step S109 in a state where the return value M is set to "M=4" in the function "mode setting ( )", and returns the return value "M=4" to the mode setter 230C by "Return(M) sentence" (Step S109).

In a case where the standby flag is "OFF", the mode setter 230C initially sets the mode value M to "M=0" in the function "mode setting ( )" (Step S101).

Subsequently, the mode setter 230C determines whether or not to refer to the voltage value of the second storage capacitor B 122 with reference to the voltage value flag in the function "mode setting ( )" (Step S102). A case where the voltage value of the second storage capacitor B 122 is referred to is a state where the voltage value Vb of the second storage capacitor B 122 is detected by the second voltage determiner 232B, and a case where the voltage value is not referred to is a state where the voltage value Vb of the second storage capacitor B 122 is not detected by the second voltage determiner 232B.

In Step S102, in a case where it is determined not to refer to the voltage value of the second storage capacitor B 122 (Step S102: a case where the voltage value is not referred to), the process progresses to Step S103, the function "mode setting ( )" determines whether the illuminance value is High or Low (Step S103).

"The voltage value is referred to" means a case where the voltage value is referred to in a case where the storage capacity of the second storage capacitor B 122 is equal to or greater than a given value with respect to the power generation amount and the storage capacity (voltage value) of the second storage capacitor B 122 has a significant influence, or the like.

A situation where "the voltage value is not referred to" means a case where the voltage value is not referred to in a case where the power generation amount is large and the storage capacity (voltage) of the second storage capacitor B 122 is extremely small with respect to the power generation amount and has little influence, or the like.

In the processing of Step S103, in a case where it is determined that the illuminance value is High (Step S103: High), the mode setter 230C progresses to Step S109 with the return value M of "M=0" in the function "mode setting ( )" as it is and returns the return value "M=0" to the mode setter 230C by "Return(M) sentence" (Step S109).

In the processing of Step S103, in a case where it is determined that the illuminance value is Low (Step S103: Low), the mode setter 230C sets "M=M+2 (=2)" in the function "mode setting ( )" (Step S104), progresses to Step S109, and returns the return value "M=2" to the mode setter 230C by "Return(M) sentence" (Step S109).

Next, the process progresses to Step S102, and in Step S102, in a case where it is determined to refer to the voltage value of the second storage capacitor B 122 (Step S102: a case where the voltage value is referred to), the mode setter 230C progresses to the processing of Step S105 and determines whether the voltage value of the second storage capacitor B 122 in the function "mode setting ( )" is High or Low (Step S105).

In the processing of Step S105, in a case where it is determined that the voltage value is High (Step S105: High), the mode setter 230C progresses to Step S107 with the return value M of "M=0" in the function "mode setting ( )" as it is.

In the processing of Step S105, in a case where it is determined that the voltage value is Low (Step S105: Low), the mode setter 230C sets the return value M in the function "mode setting ( )" to "M=M+1 (=1)" (Step S106), and thereafter, progresses to Step S107.

Subsequently, in Step S107, the mode setter 230C determines whether the illuminance value in the function "mode setting ( )" is High or Low.

In Step S107, in a case where it is determined that the illuminance value is High, the mode setter 230C returns the return value M to the mode setter 230C by "Return(M) sentence" without changing the return value M in the function "mode setting ( )" (Step S109).

In Step S107, in a case where it is determined that the illuminance value is Low, the mode setter 230C sets the return value M in the function "mode setting ( )" to "M=M+1" (Step S108), and returns the return value M to the mode setter 230C by "Return(M) sentence" (Step S109).

With the procedure of the processing described above, the mode setter 230C determines whether the standby flag is in the "ON" state or the "OFF" state. In a case where the standby flag is in the "ON" state, the mode setter 230C can set the mode of the transmission time interval to Mode4. In a case where the standby flag is in the "OFF" state, the mode setter 230C can set the mode of the transmission time interval to any one of Mode0, Mode1, and Mode2.

In a case where the voltage value is referred to, as shown in FIG. 8B, the mode setter 230C can set the mode of the transmission time interval to any one of Mode0, Mode1, and Mode2 according to the voltage value of the electricity storage 120 and the illuminance value detected by the illuminance sensor 213.

In a case where the voltage value is not referred to, as shown in FIG. 8C, the mode setter 230C can set the mode to any one of Mode0 and Mode2 according to the illuminance value detected by the illuminance sensor 213.

In the example shown in FIG. 8B, although an example where each of the illuminance value and the voltage value is divided into High and Low with respect to one predetermined threshold has been shown, each of the illuminance value and the voltage value may be divided into three or more ranges using a plurality of thresholds. That is, the mode setter 230C may subdivide the illuminance value and the voltage value to set the transmission interval time.

Similarly, in the example shown in FIG. 8C, although an example where the illuminance value is divided into High and Low with respect to one predetermined threshold has been shown, the illuminance value may be divided into three or more ranges using a plurality of thresholds. That is, the mode setter 230C may subdivide the illuminance value to set the transmission interval time.

Figure 10:
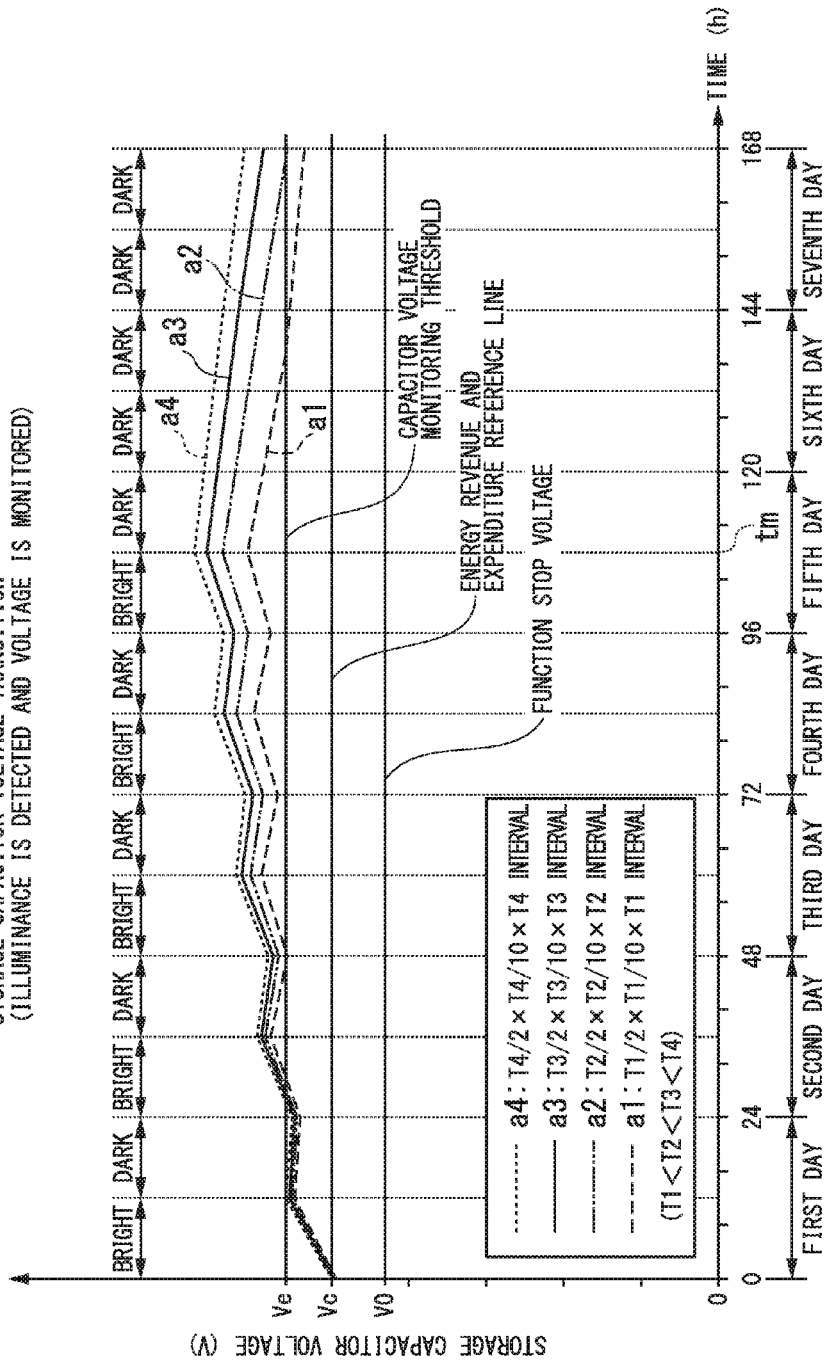
FIG. 10 is a graph showing voltage transition of a storage capacitor in a case where surrounding illuminance is detected by an illuminance sensor and voltage monitoring of the storage capacitor is performed.

FIG. 10 is a graph showing voltage transition of the storage capacitor in a case where surrounding illuminance is detected by the illuminance sensor and voltage monitoring of the storage capacitor is performed. This graph shows voltage transition of the second storage capacitor B 122 for one week, for example, in an office or the like. That is, voltage transition of the second storage capacitor B 122 for five weekdays from the first day to the fifth day and two holidays from the sixth day to the seventh day is shown.

In FIG. 10, the vertical axis indicates the voltage (V) of the storage battery, and the horizontal axis indicates elapsed time (h: hour). FIG. 10 shows voltage transition characteristics a1 to a4 of the second storage capacitor B 122 in parallel in a case where the reference set time of the transmission time interval is changed to T1, T2, T3, and T4 (T1<T2<T3<T4) in units of minutes. A voltage (a voltage at the time 0) to be a starting point is referred to as a voltage Vc to be a reference line for obtaining the energy revenue and expenditure balance. A period indicated by "bright" indicates a time zone where the inside of an office becomes bright with an illumination or external light, and a period indicated by "dark" indicates a period during which the inside of the office becomes dark at night or when an illumination is turned off. This example is an example where the illuminance sensor 213 is provided, and the illuminance determiner 231 compares the measurement value of the illuminance sensor 213 with a predetermined threshold to determine whether the inside of the office is "bright" or "dark".

The voltage V0 indicates the voltage value of the second storage capacitor B 122 capable of driving the environment monitor 210C. That is, the voltage V0 indicates the function stop voltage at which the environment monitor 210C stops functioning if the voltage of the second storage capacitor B 122 decreases to the voltage V0 or less. The voltage Vc indicates a voltage value to be a reference for obtaining the energy revenue and expenditure balance, and the voltage of the storage capacitor in the voltage transition characteristics a1 to a4 of the storage capacitor has the voltage Vc as a starting point. The voltage Ve indicates a threshold voltage to be a reference of determination for monitoring the voltage of the second storage capacitor B 122.

The voltage transition characteristic indicated by symbol a1 is an example where the reference set time is set to T1 which is the shortest time, and shows an example where, in a case of extending the transmission time interval, the transmission time interval at which the storage capacitor voltage is equal to or less than Vc is two times in the daytime (illuminance is equal to or greater than a threshold) and is ten times at night (illuminance is equal to or less than a threshold).

Similarly, the voltage transition characteristic indicated by symbol a2 shows an example where the reference set time is set to T2 (T2>T1), the voltage transition characteristic indicated by symbol a3 shows an example where the reference set time is set to T3 (T3>T2), and the voltage transition characteristic indicated by symbol a4 shows an example where the reference set time is set to T4 (T4>T3).

As shown in FIG. 10, in a time zone of "bright" where the inside of the office becomes bright with an illumination or external light from the first day to the fifth day, that is, from the elapsed time "0 hour" to the elapsed time "120 hours", the state of "bright" is detected by the illuminance sensor 213, the transmission time interval of the transmission unit 240A is set as the reference set time, and the charging of the second storage capacitor B 122 is performed. In a period of "dark" during which power generation is not performed, the state of "dark" is detected by the illuminance sensor 213, and the transmission time interval of the transmission unit 240A is set to two times or ten times the reference set time. As a result, in the electricity storage 120, the charging and discharging operation is repeated to increase the voltage of the second storage capacitor B 122 in the period of "bright" and to decrease the voltage of the second storage capacitor B 122 gently if the period of "dark" is started. At the time tm at which the period of "bright" of the fifth day ends, the charged voltage of the second storage capacitor B 122 is maximized. After the time tm, the period of "dark" is started, and the voltage of the second storage capacitor B 122 decreases linearly from the elapsed time "tm hours" to the elapsed time "168 hours".

In this way, in a case of performing an operation to obtain the energy revenue and expenditure balance based on two kinds of information including illuminance information acquired by the illuminance sensor 213 and information relating to the voltage (storage capacity) of the second storage capacitor B 122, the transmission time interval at the voltage Vc of the storage capacitor is or less is two times in the daytime (illuminance is equal to or greater than the threshold) and is set to ten times at night (illuminance is equal to or less than the threshold), whereby the inclination at the voltage Vc or less increases rapidly in the daytime and decreases gently at night, and energy revenue and expenditure for one week become plus even when T1 which is the shortest transmission time interval is set.

Figure 11:
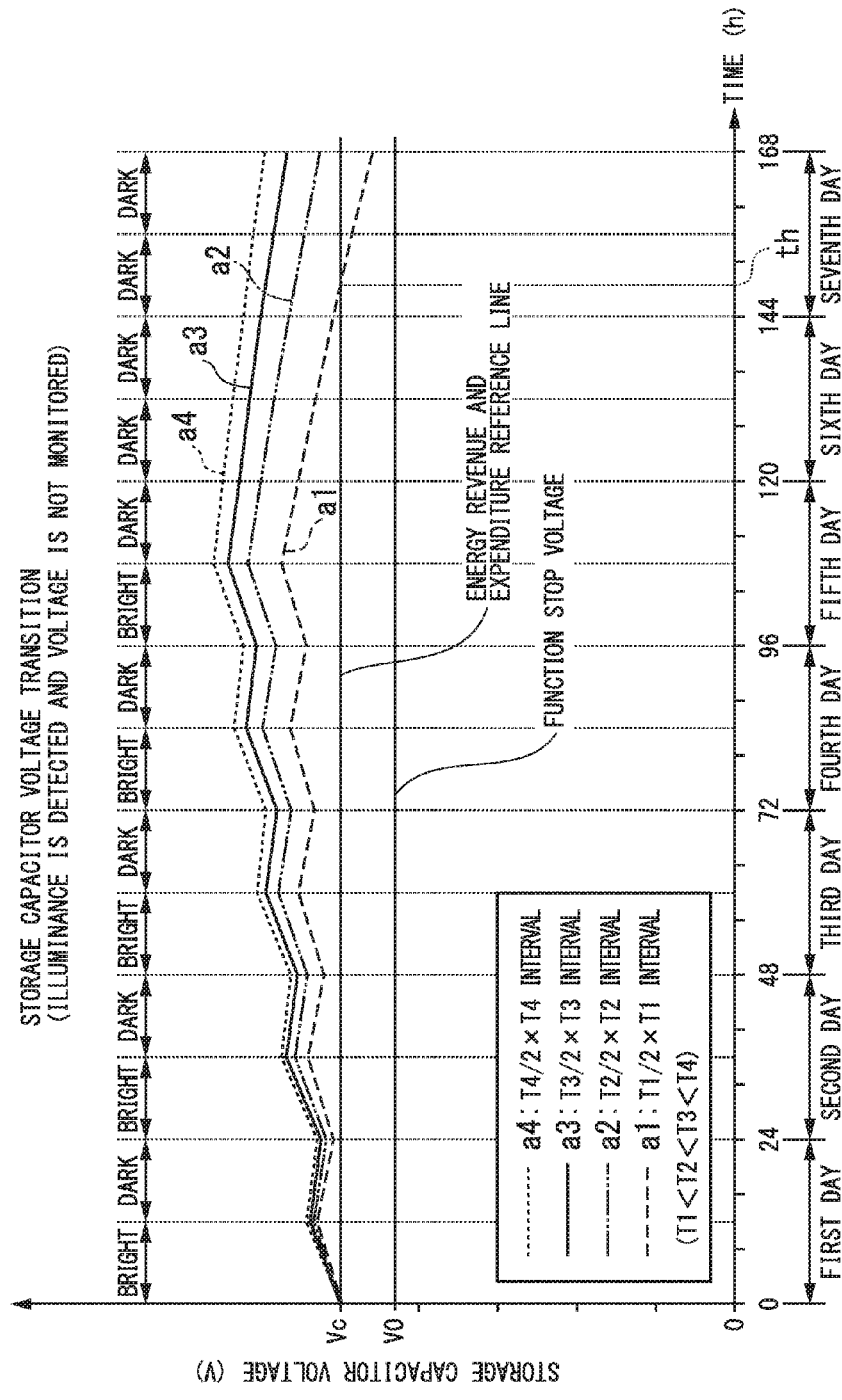
FIG. 11 is a graph showing voltage transition of a storage capacitor in a case where illuminance is detected by an illuminance sensor, but voltage monitoring of the storage capacitor is not performed.

FIG. 11 is a graph showing voltage transition of the storage capacitor in a case where illuminance is detected by the illuminance sensor, but voltage monitoring of the storage capacitor is not performed. Similarly to FIG. 10 described above, FIG. 11 shows voltage transition of the second storage capacitor B 122 for one week in an office or the like. However, in the example shown in FIG. 11, monitoring of illuminance is performed using the illuminance sensor 213, but voltage monitoring of the second storage capacitor B 122 is not performed.

FIG. 11 shows voltage transition characteristics a1 to a4 of the storage capacitor in parallel in a case where the reference set time of the transmission time interval is changed to T1, T2, T3, and T4 (T1<T2<T3<T4) in units of minutes. A voltage (a voltage at the time 0) to be a starting point is a voltage Vc to be a reference line for obtaining the energy revenue and expenditure balance.

The voltage transition characteristic indicated by symbol a1 is an example where the reference set time is set to T1 which is the shortest time, and shows a case where, in a case of extending the transmission time interval, the transmission time interval is set to "2×T1". Similarly, the voltage transition characteristic indicated by symbol a2 shows an example where the reference set time is set to T2 (T2>T1), the voltage transition characteristic indicated by symbol a3 shows an example where the reference set time is set to T3 (T3>T2), and the voltage transition characteristic indicated by a4 shows an example where the reference set time is set to T4 (T4>T3).

In this way, in order to obtain the energy revenue and expenditure balance based on information of the illuminance sensor 213, the transmission time interval is two times at night (illuminance is equal to or less than the threshold), the downward inclination indicating night and a weekend becomes gentle, and when T2, T3, and T4 are set, energy revenue and expenditure for one week become plus. However, when T1 is set, after the elapsed time th, energy revenue and expenditure become minus, and the function stop voltage is not reached even if the seven days have elapsed.

Figure 12:
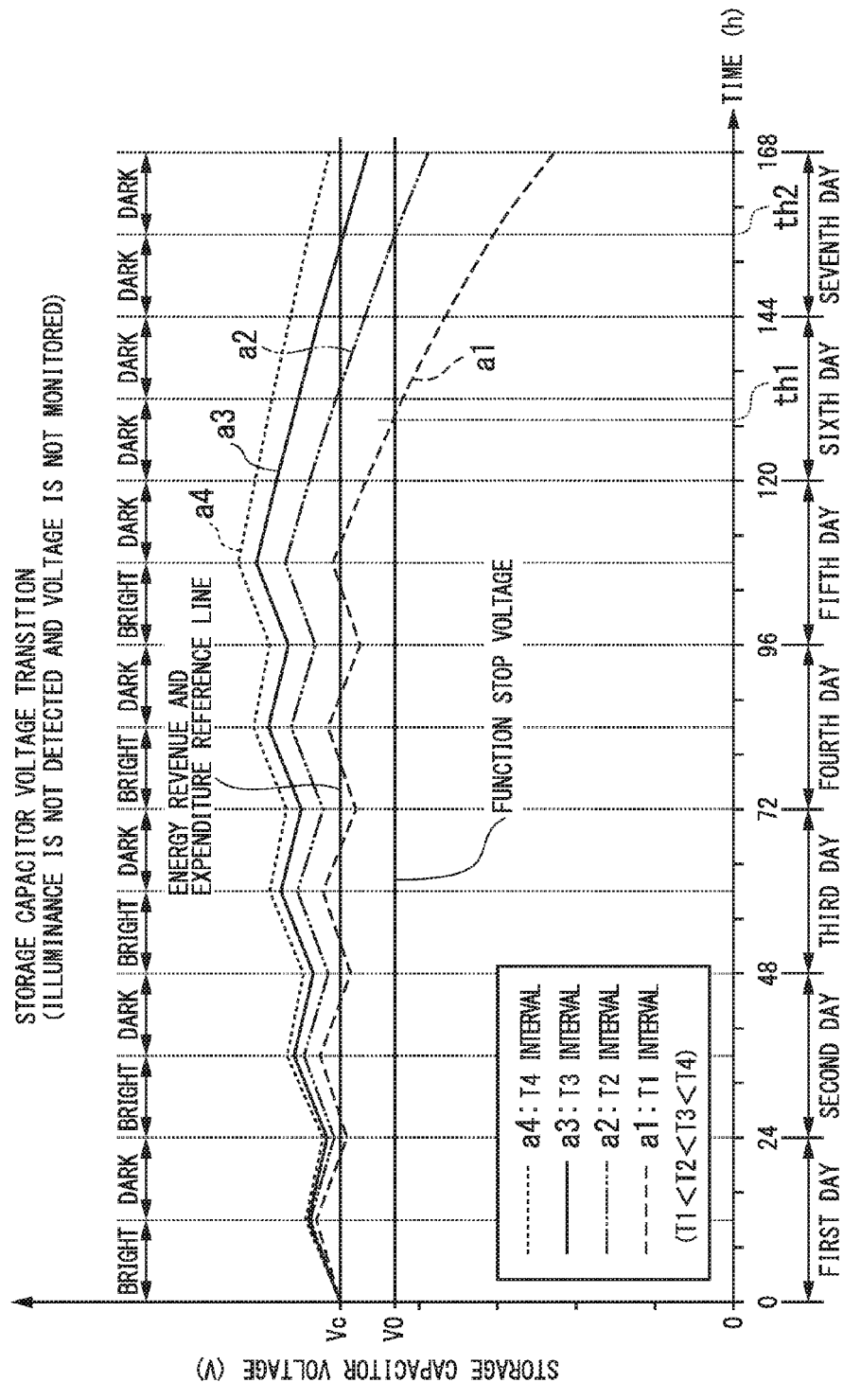
FIG. 12 is a graph showing voltage transition of a storage capacitor in a case where detection of illuminance by an illuminance sensor is not performed and voltage monitoring of the storage capacitor is not performed.

FIG. 12 is a graph showing voltage transition of the storage capacitor in a case where detection of illuminance by the illuminance sensor is not performed and voltage monitoring of the storage capacitor is not performed. Similarly to FIGS. 10 and 11 described above, this example shows voltage transition of the second storage capacitor B 122 for one week in an office or the like. However, the example shown in FIG. 12 is an example where illuminance monitoring by the illuminance sensor 213 is not performed and voltage monitoring of the second storage capacitor B 122 is not performed. That is, the example shown in FIG. 12 is an example where an operation to obtain the energy revenue and expenditure balance is not performed.

FIG. 12 shows voltage transition characteristics a1 to a4 of the storage capacitor in parallel in a case where the reference set time of the transmission time interval is changed to T1, T2, T3, and T4 (T1<T2<T3<T4) in units of minutes, and a voltage (a voltage at the time 0) to be a starting point is a voltage Vc to be a reference line for obtaining the energy revenue and expenditure balance.

The voltage transition characteristic indicated by symbol a1 is an example where the reference set time is set to T1 which is the shortest time. Similarly, the voltage transition characteristic indicated by symbol a2 shows an example where the reference set time is set to T2 (T2>T 1), the voltage transition characteristic indicated by symbol a3 shows an example where the reference set time is set to T3 (T3>T2), and the voltage transition characteristic indicated by symbol a4 shows an example where the reference set time is set to T4 (T4>T3).

As shown in FIG. 12, in a case where an operation to obtain the energy revenue and expenditure balance is not performed, when the transmission time interval is set to T1 which is shortest, as shown in the characteristic a1, at the elapsed time th1 of the sixth day, the voltage of the second storage capacitor B 122 reaches the function stop voltage of the environment monitor 210C. When the transmission time interval is set to T2 which is next shortest to T1, as shown in the characteristic a2, at the elapsed time th2 of the seventh day, the voltage of the second storage capacitor B 122 reaches the function stop voltage of the environment monitor 210C. If the transmission time interval becomes T3 and T4, the energy revenue and expenditure balance is obtained.

In this way, in a case where there is no function of obtaining the energy revenue and expenditure balance, when the transmission time interval is set to be equal to or less than T2, energy revenue and expenditure for one week become minus, and consequently, the function stop voltage of the environment monitor 210C is reached.

As described above, in the sensor node 10, in a case where the environment monitor 210C operates in units of weeks, the charging of the second storage capacitor B 122 from the solar battery 110 can be performed on weekdays (the first day to the fifth day), and electric power stored in the second storage capacitor B 122 can be used on holidays (the sixth day and the seventh day).

Although the embodiment of the invention has been described, for example, the above-described illuminance sensor 213 may measure the generated voltage of the solar battery 110, and thus, the solar battery 110 may be used instead of the illuminance sensor 213. Alternatively, the power generation amount of the solar battery 110 may be measured by measuring change in the voltage of the first storage capacitor A 121 or the second storage capacitor B 122 charged from the solar battery 110, and surrounding illuminance may be measured based on information relating to the power generation amount.

In the above-described sensor node 10, although an example where the solar battery is used as the power generator has been described, as power generation means, vibration, heat, or wind power generation may be used. In each case of vibration, heat, and wind power generation, various kinds of environmental information are detected by a vibration sensor, a temperature sensor, an airflow meter, and the like, and a wireless transmission interval is automatically changed based on the environmental information, whereby it is possible to obtain the same effects as in the sensor node 10 described above.

Second Embodiment

In a second embodiment, the same members as those in the first embodiment described above are represented by the same reference numerals, and a description thereof will be omitted or simplified.

Figure 13:
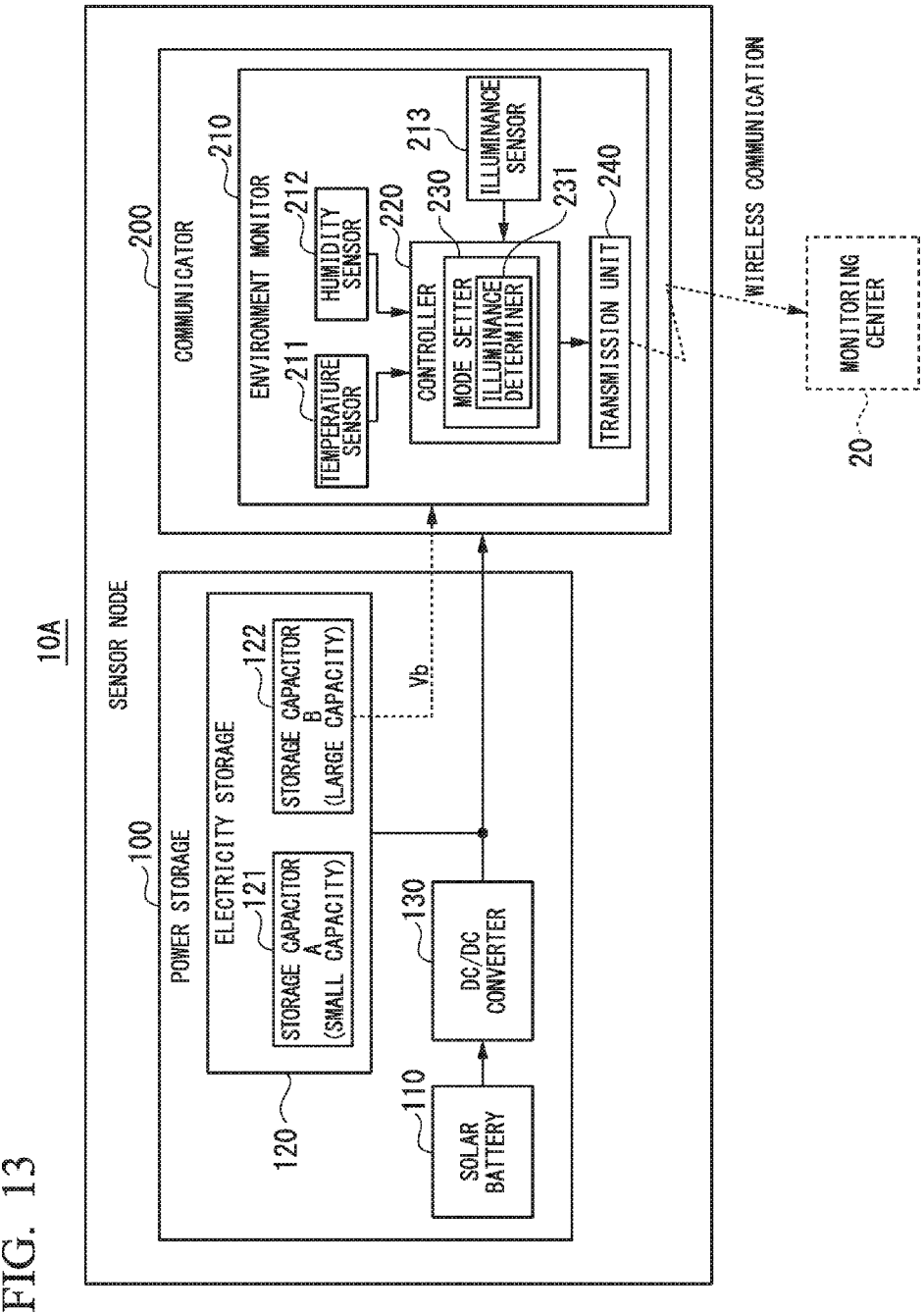
FIG. 13 is a block diagram showing a first configuration example of a sensor node in a second embodiment.
Figure 14:
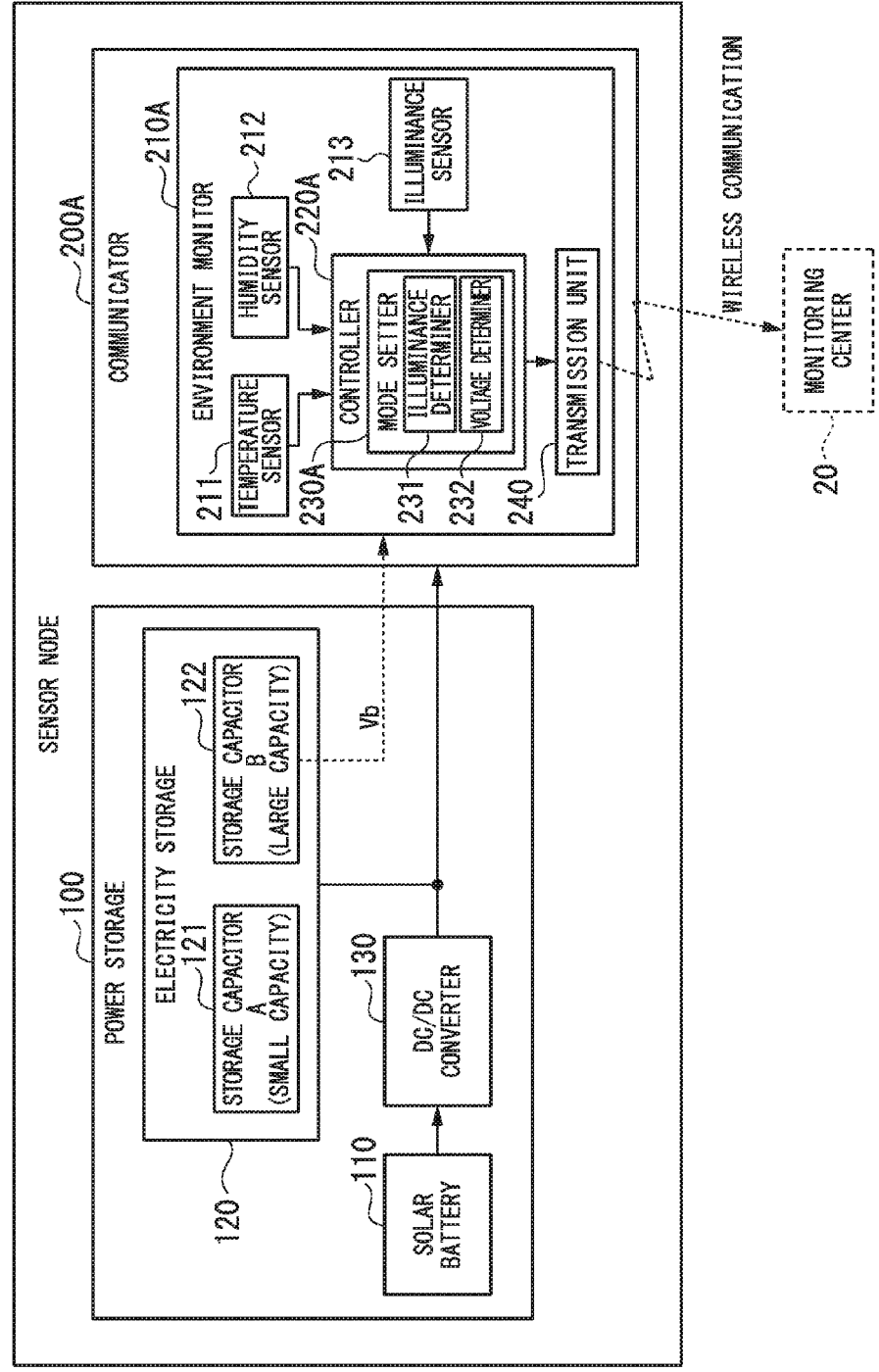
FIG. 14 is a block diagram showing a second configuration example of the sensor node in the second embodiment.

As in the first embodiment, in the second embodiment, a switching device 300 is provided between a communicator 200 (200A) and a power storage 100. In FIGS. 13 and 14, the switching device is not shown. In the first embodiment, the power storage 100 including the first switch 141, the second switch 142, the first switch selector 160, the second switch selector 170, and the supply circuit 180 has been described. A sensor node of the second embodiment includes the same power storage 100 as that in the first embodiment. For this reason, in the second embodiment, a description of the power storage 100 and the switching device 300 will be omitted, and a communicator will be described in detail.

First Configuration Example

In the communicator 200C described above, although the mode setter 230C includes the illuminance determiner 231, the first voltage determiner 232A, and the second voltage determiner 232B, in a first configuration example of this embodiment, a communicator 200 includes only an illuminance determiner.

FIG. 13 is a block diagram showing the first configuration example of the sensor node of the second embodiment. As shown in FIG. 13, a sensor node 10A has a power storage 100, a communicator 200, and a switching device (not shown). The communicator 200 is constituted as an environment monitor 210, and the environment monitor 210 functions as a wireless sensor.

The environment monitor 210 includes a temperature sensor 211, a humidity sensor 212, an illuminance sensor 213, a controller 220, and a transmission unit 240.

The temperature sensor 211, the humidity sensor 212, and the illuminance sensor 213 have the functions described in the first embodiment, and are connected to the first switcher 310 of the switching device 300.

Similarly to the controller 220C of the first embodiment, the controller 220 is connected to the first switcher 310 of the switching device 300.

Similarly to the transmission unit 240A of the first embodiment, the transmission unit 240 is connected to the second switcher 320 of the switching device 300.

The controller 220 has a mode setter 230. The mode setter 230 includes an illuminance determiner 231. The illuminance determiner 231 has the function described in the first embodiment.

In the sensor node 10A shown in FIG. 13, a decrease in the amount of energy generated by the solar battery 110 is detected by the illuminance sensor 213, and the illuminance determiner 231 extends the transmission time interval according to the detection result to reduce energy consumption. That is, if wireless transmission is performed at the same transmission time interval as in a stationary state where the detected illuminance is equal to or greater than a predetermined amount of illuminance value in a state where the amount of generated energy decreases, there is a possibility that the energy of the electricity storage 120 is used in a short period of time to the voltage at which the environment monitor 210 stops functioning. In order to avoid the function stop of the environment monitor 210, in a case where a decrease in the amount of generated energy is detected, the controller 220 extends the transmission time interval, thereby reducing energy consumption.

Second Configuration Example

FIG. 14 is a block diagram showing a second configuration example of the sensor node of the second embodiment. As shown in FIG. 14, a sensor node 10B has a power storage 100, a communicator 200A, and a switching device 300. The communicator 200A is constituted as an environment monitor 210A, and the environment monitor 210A functions as a wireless sensor. In particular, the second configuration example is different from the first configuration example in that the mode setter 230A sets the transmission time interval based on information relating to illuminance detected by the illuminance sensor 213 and information relating to the storage capacity of the second storage capacitor B 122.

The environment monitor 210A includes a temperature sensor 211, a humidity sensor 212, an illuminance sensor 213, a controller 220A, and a transmission unit 240.

The temperature sensor 211, the humidity sensor 212, and the illuminance sensor 213 have the functions described in the first embodiment, and are connected to the first switcher 310 of the switching device 300.

Similarly to the controller 220C of the first embodiment, the controller 220A is connected to the first switcher 310 of the switching device 300.

Similarly to the transmission unit 240A of the first embodiment, the transmission unit 240 is connected to the second switcher 320 of the switching device 300.

The functional units which perform the same operations as the sensor node 10A shown in FIG. 13 are represented by the same reference numerals, and a description thereof will be omitted.

The controller 220A has a mode setter 230A. The mode setter 230A includes a voltage determiner 232, in addition to the illuminance determiner 231.

In the sensor node 10A (FIG. 13) described above, the transmission time interval is extended in a state where power generation is little, thereby extending the time for which the environment monitor 210 stops operating. However, in a case where control is performed only based on this condition, since there is a possibility that energy expenditure exceeds revenue, consequently, there is a possibility that the environment monitor 210 stops functioning. Accordingly, in the sensor node 10B, the voltage determiner 232 is further provided, and both of the illuminance determiner 231 and the voltage determiner 232 are monitored.

The voltage determiner 232 has the same function as the second voltage determiner 232B of the first embodiment, and thus, a description thereof will be omitted.

The mode setter 230A sets the mode for changing the transmission interval time according to the storage capacity of the electricity storage 120. The controller 220A controls the transmission time interval in the transmission unit 240 according to the mode set by the mode setter 230A. The details of mode setting in the mode setter 230A will be described below.

In the sensor node 10B shown in FIG. 14, similarly to the above-described sensor node 10A (FIG. 13), illuminance (the amount of energy generated by the solar battery 110) is monitored by the illuminance determiner 231. In the sensor node 10B, the charged voltage Vb (storage capacity) of the second storage capacitor B 122 is also monitored. The monitoring results of both of the illuminance and the charged voltage Vb (storage capacity) of the second storage capacitor B 122 are used, whereby it is possible to further adjust the transmission time interval in a stepwise manner. With this, it is possible to further extend the time to the function step of the environment monitor 210A. The details will be described below.

In the first configuration example and the second configuration example of the second embodiment described above, as in the first embodiment, the power storage 100 performs processing based on the flowcharts shown in FIGS. 5 and 6. In this embodiment, a description of the processing will be omitted.

Details of Operation of Environment Monitor 210

As described above, in the environment monitor 210 (210A), the mode setter 230 (230A) in the controller 220 (220A) sets the transmission time interval, at which the transmission unit 240 performs wireless transmission, based on the power generation amount of the solar battery 110 or based on the power generation amount of the solar battery 110 and the storage capacity of the second storage capacitor B 122. The setting of the transmission time interval is performed in three modes.

FIGS. 8A to 8C are explanatory views showing the types of modes for setting the transmission time interval, and the transmission time interval (for example, the time in units of minutes) corresponding to each mode is shown in a table. As shown in the table of FIG. 8A, the modes which are set by the mode setter 230 are four modes of Mode0, Mode1, Mode2, and Mode4. The four modes of Mode0, Mode1, Mode2, and Mode4 are the same as those in the first embodiment described above, and thus, a description thereof will be omitted.

In the example shown in FIG. 8A, although an example where the four modes (Mode0, Mode1, Mode2, and Mode4) are set has been shown, the types of modes to be set may be three or less, or five or more.

In a case where the mode setter 230 sets the mode of the transmission time interval, a mode setting method is different according to a case where the voltage determiner 232 is not provided (see FIG. 13) and a case where the voltage determiner 232 is provided (see FIG. 14).

Mode Setting Processing

The mode setting processing of the second embodiment is performed based on the flowchart shown in FIG. 9. For this reason, a description of the mode setting processing of the second embodiment will be omitted. The voltage determiner 232 has the same function as the second voltage determiner 232B, and thus, a description thereof will be omitted. The illuminance determiner 231 is the same as in the first embodiment, and thus, a description thereof will be omitted.

Although the embodiment of the invention has been described, for example, the above-described illuminance sensor 213 may measure the generated voltage of the solar battery 110, and the solar battery 110 may be used instead of the illuminance sensor 213. Alternatively, the power generation amount of the solar battery 110 may be measured by measuring change in the voltage of the first storage capacitor A 121 or the second storage capacitor B 122 charged from the solar battery 110, and surrounding illuminance may be determined based on information relating to the power generation amount. According to the sensor nodes 10A and 10B of this embodiment, it is possible to achieve a battery-less structure. In addition, it is possible to quickly recover the sensor nodes 10A and 10B even in a case where the energy revenue and expenditure balance between the power generation amount and the power consumption collapses.

In the sensor nodes 10A and 10B described above, although an example where the solar battery is used as the power generator has been described, as power generation means, vibration, heat, or wind power generation may be used. In each case of vibration, heat, and wind power generation, various kinds of environmental information are detected by a vibration sensor, a temperature sensor, an airflow meter, and the like, and a wireless transmission interval is automatically changed based on the environmental information, whereby it is possible to obtain the same effects as in the sensor node 10 described above.

Third Embodiment

In the power storage 100 described above, although the storage capacitor is used as the storage battery, the storage capacitor has a lifetime. For example, the second storage capacitor B 122 has a chargeable maximum voltage determined as a saturation voltage, and if a saturation voltage state is continued for a long period of time, the lifetime of the second storage capacitor B 122 is degraded. For this reason, it is necessary to limit the voltage of the second storage capacitor B 122 so as not to be charged to the saturation voltage or more. For this reason, it is necessary to limit the voltage of the second storage capacitor B 122 so as not to be maintained at the saturation voltage for a long period of time. In this embodiment, as in the second embodiment, the switching device 300 is omitted.

For this reason, in the sensor node, in a case where the voltage charged in the second storage capacitor B 122 comes close to the saturation voltage, the transmission interval of the transmission unit 240 is shortened to increase power consumption, thereby decreasing the voltage of the second storage capacitor B 122. Alternatively, in the sensor node, a dummy circuit which consumes electric power is provided and electric power is consumed by the dummy circuit, thereby decreasing the voltage of the second storage capacitor B 122. With this, the sensor node can extend the lifetime of the second storage capacitor B 122.

Hereinafter, an example where the transmission interval of the transmission unit 240 is shortened to increase power consumption, thereby decreasing the voltage of the second storage capacitor B 122 is described as a sensor node of a third embodiment.

In the third embodiment, the same members as those in the first embodiment and the second embodiment described above are represented by the same reference numerals, and a description thereof will be omitted or simplified.

Figure 15:
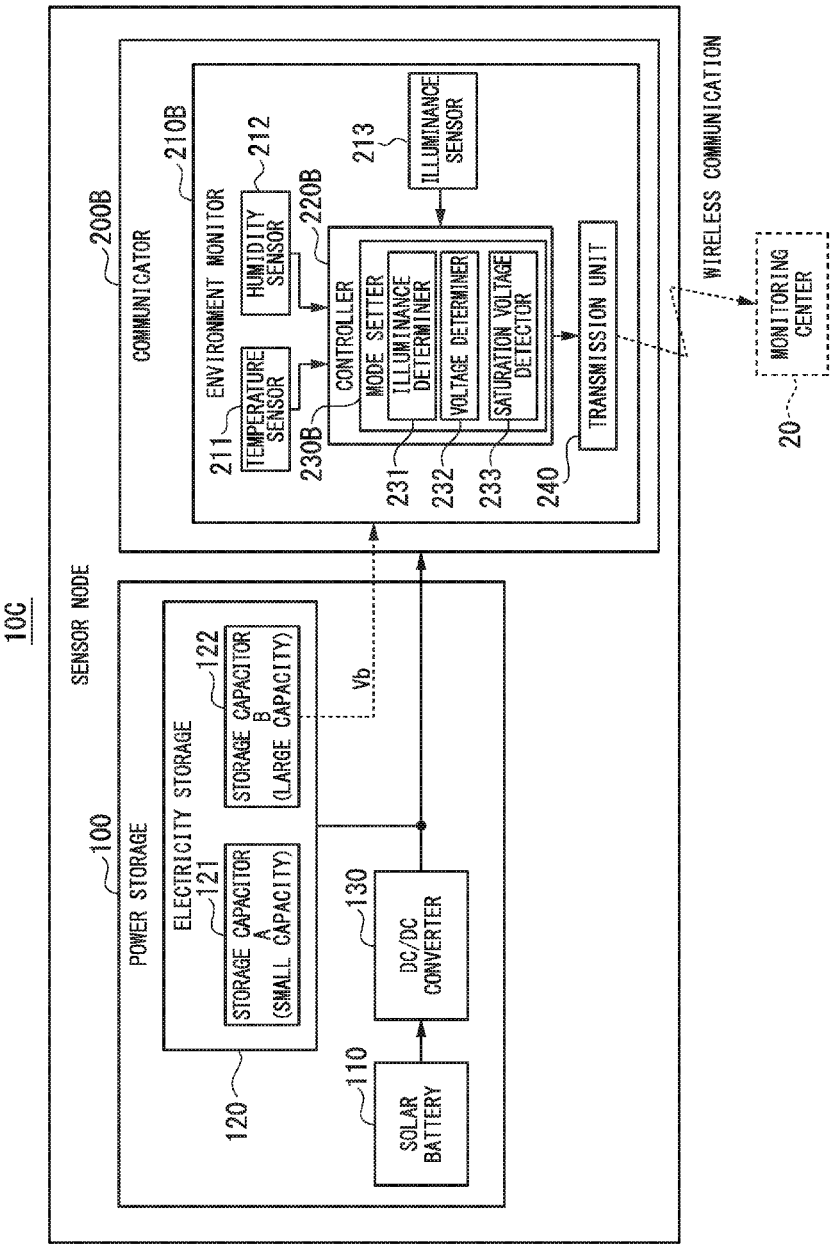
FIG. 15 is a block diagram showing the configuration of a sensor node in a third embodiment.

FIG. 15 is a block diagram showing the configuration of a sensor node 10C in the third embodiment of the invention. In the second embodiment, a switching device 300 is provided between a communicator 200B and a power storage 100.

As shown in FIG. 15, the sensor node 10C has a power storage 100 and a communicator 200B. The communicator 200B includes an environment monitor 210B. The environment monitor 210B includes a temperature sensor 211, a humidity sensor 212, a controller 220B, an illuminance sensor 213, and a transmission unit 240. The controller 220B has a mode setter 230B. The mode setter 230B includes an illuminance determiner 231, a voltage determiner 232, and a saturation voltage detector 233.

The sensor node 10C is different from the sensor node 10B shown in FIG. 14 in that the saturation voltage detector 233 is added in the controller 220B of the environment monitor 210B, and other configurations are the same as those of the sensor node 10B shown in FIG. 14. For this reason, the same configurations are represented by the same reference numerals, and an overlapping description will not be repeated.

The saturation voltage detector 233 monitors the voltage Vb of the second storage capacitor B 122 and detects that the voltage Vb comes close to a predetermined saturation voltage Vsat. For example, the saturation voltage detector 233 determines whether or not the voltage Vb of the second storage capacitor B 122 exceeds a voltage VH with a voltage VH (=Vsat−ΔV) lower than the saturation voltage Vsat by a predetermined voltage ΔV as a threshold voltage. In a case where it is determined that the voltage Vb of the second storage capacitor B 122 exceeds the voltage VH, the saturation voltage detector 233 notifies the mode setter 230B of a signal to this effect.

In FIG. 14, although a case where the controller 220B includes the voltage determiner 232 has been shown, in the sensor node 10A (see FIG. 13) in which the controller 220B does not include the voltage determiner 232, the saturation voltage detector 233 may be provided in the controller 220B to monitor the voltage of the second storage capacitor B 122, and it may be detected that the voltage comes close to the predetermined saturation voltage Vsat.

FIG. 16 is an explanatory view showing the types of modes for setting the transmission time interval in the third embodiment, and the transmission time interval (for example, the time in units of minutes) corresponding to each mode is shown in a table. As shown in the table of FIG. 16, the modes which are set by the controller 220B are four modes of Mode0, Mode1, Mode2, and Mode3. In FIG. 16, symbols T1 to T4 are the reference set time as in FIGS. 8A to 8C.

The table shown in FIG. 16 is the same as the table shown in FIGS. 8A to 8C except that Mode3 is newly added. That is, Mode0 is a mode in which the transmission unit 240 performs transmission at each reference set time, Mode1 is a mode in which the transmission unit 240 performs transmission at a time interval two times the reference set time, and Mode2 is a mode in which the transmission unit 240 performs transmission at a time interval ten times the reference set time. Mode4 is a mode in which the transmission unit 240 performs transmission at a time interval 20 times the reference set time. Newly added Mode3 is a mode in which the transmission unit 240 performs transmission at a time interval 0.5 times the reference set time.

Figure 17:
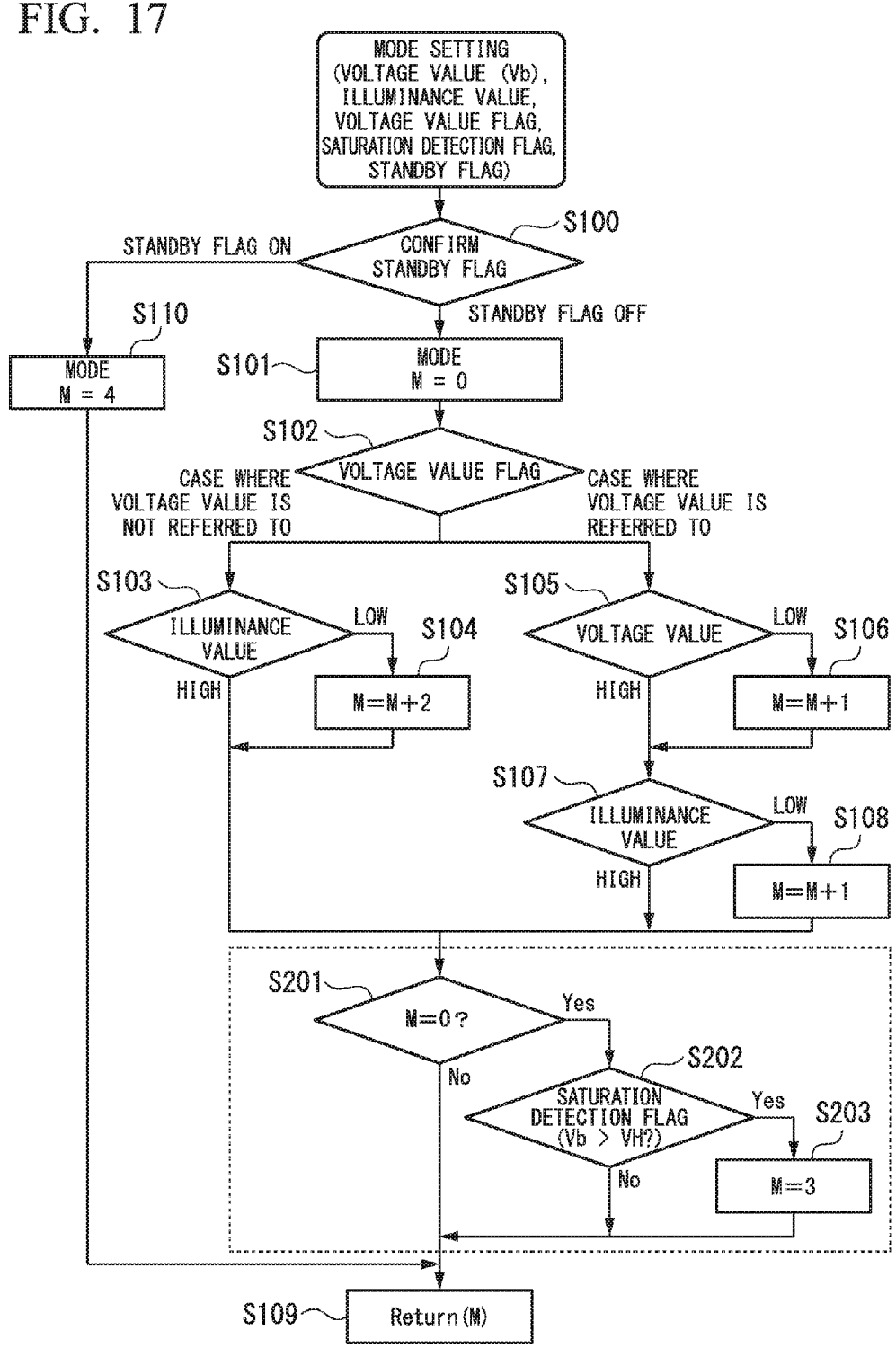
FIG. 17 is a flowchart showing the flow of mode setting processing in the third embodiment.

FIG. 17 is a flowchart showing the flow of mode setting processing in the third embodiment.

The example shown in FIG. 17 shows the flow of processing in a function "mode setting ( )" of setting a mode. In this example, the function "mode setting ( )" uses, as arguments, the voltage value of the second storage capacitor B 122, the illuminance value, a voltage value flag indicating the presence or absence of the voltage value of the second storage capacitor B 122, a saturation detection flag, and a standby flag, and generates a value M indicating the type of mode as a return value. That is, in the function "mode setting ( )" for use in the flowchart shown in FIG. 17, the argument "saturation detection flag" is newly added compared to the function "mode setting ( )" shown in FIG. 9.

The saturation detection flat is a flag which is set by the saturation voltage detector 233, a flag indicating saturation is set in a case where the voltage Vb of the second storage capacitor B 122 exceeds the voltage VH, and a flag indicating unsaturation is set in a case where the voltage Vb of the second storage capacitor B 122 is equal to or less than the voltage VH.

The flowchart shown in FIG. 17 is the same as the flowchart shown in FIG. 9 except that Steps S201, S202, and S203 are newly added, and the processing of Steps S101 to S108 is the same as in FIG. 9. For this reason, the steps in which the same processing as in FIG. 9 is performed are represented by the same step numbers, and an overlapping description will not be repeated.

Hereinafter, the flow of the mode setting processing will be described with reference to FIG. 17.

If the mode setting processing is started, it is confirmed whether the standby flag is "ON" or "OFF" (Step S100). The standby flag is set to "ON" in Step S412 described above, and is set to "OFF" in Step S407 described above. In a case where the standby flag is "ON", the mode setter 230B initially sets the mode value M to "M=4" in the function "mode setting ( )" (Step S110). The mode setter 230B progresses to Step S109 in a state where the return value M is set to "M=4" in the function "mode setting ( )", and returns the return value "M=4" to the mode setter 230B by "Return(M) sentence" (Step S109).

In a case where the standby flag is "OFF", the mode setter 230B initially sets the mode value M to "M=0" in the function "mode setting ( )" (Step S101).

If the mode setting value M is set after the processing of Steps S101 to S108 is performed in the mode setter 230B, the mode setter 230B progresses to the processing of Step S201 and determines whether or not "M=0" in the function "mode setting ( )".

In the processing of Step S201, in a case where it is determined that "M=0" is not established (Step S201: No), the mode setter 230B progresses to the processing of Step S109, and returns the mode setting value M set by the processing of Steps S101 to S108 in the function "mode setting ( )" to the mode setter 230B by "Return(M) sentence" (Step S109).

In the processing of Step S201, in a case where it is determined that "M=0" (Step S201: Yes), the mode setter 230B progresses to the processing of Step S202, and determines whether or not the voltage of the second storage capacitor B 122 exceeds the threshold voltage value VH with reference to the saturation detection flag in the function "mode setting ( )". In the processing of Step S202, in a case where it is determined that the voltage of the second storage capacitor B 122 is not equal to or greater than the voltage value VH (Step S202: No), the mode setter 230B progresses to the processing of Step S109, and returns the mode setting value "M=0" in the function "mode setting ( )" to the mode setter 230B by "Return(M) sentence".

In the processing of Step S202, in a case where the voltage of the second storage capacitor B 122 exceeds the voltage VH (Step S202: Yes), the mode setter 230B sets the mode setting value M to "M=3" in the mode setting function setting ( ) (Step S203), then, progresses to Step S109, and returns the value "M=3" to the mode setter 230B by "Return (M) sentence".

With this, in the mode setter 230B, in a case where the voltage of the second storage capacitor B 122 comes close to the saturation voltage Vsat, the mode of the transmission time interval is set to Mode3, whereby it is possible to shorten the transmission time interval of the transmission unit 240 to increase power consumption. For this reason, in the power storage 100, it is possible to avoid the charging of the second storage capacitor B 122 to the saturation voltage Vsat.

As described above, the sensor node (10, 10A, 10B) in the embodiment of the invention includes the environment sensor (the temperature sensor 211 and the humidity sensor 212) configured to acquire information relating to the surrounding environment, the power generator (the solar battery 110) configured to perform environmental power generation, the electricity storage (the electricity storage 120, the first storage capacitor A 121, and the second storage capacitor B 122) configured to store energy generated by the power generator to generate a power supply, the detector (the illuminance sensor 213) configured to detect the amount of energy generated by the power generator, the transmission unit (240A, 240) configured to transmit the transmission signal including information relating to the surrounding environment acquired by the environment sensor in a wireless manner, and the controller (220, 220A, 220B) configured to change the mode of the transmission operation in the transmission unit based on the detection result of the amount of energy generated by the power generator.

In the sensor node (10, 10A, 10B) configured as above, the mode (for example, the transmission interval time) of the transmission operation in the transmission unit 240 is changed according to the amount of energy generated by the solar battery 110. With this, the sensor node (10, 10A, 10B) can obtain the energy revenue and expenditure balance between the generated power and the power consumption. For this reason, in the sensor node (10, 10A, 10B), it is possible to achieve a battery-less structure. In addition, it is possible to quickly recover the sensor node even in a case where the energy revenue and expenditure balance between the power generation amount and the power consumption collapses.

In the first embodiment to the third embodiment, although an example where the transmission unit 240 or 240A performs wireless communication has been described, wired communication may be performed.

In the first embodiment to the third embodiment, although the storage capacitor is used as the storage battery, the storage battery may be a lithium-ion capacitor (LiC). In addition, the number of storage batteries is not limited, and the number of storage batteries may be one or more.

The above-described electricity storage 120 includes the two storage capacitors, that is, the first storage capacitor A 121 and the second storage capacitor B 122. The invention is not intended to limit the number of storage capacitors, and the electricity storage 120 may include one storage capacitor.

In addition, in the sensor node of the embodiment described above, for changing the transmission time interval of the transmission unit, instead of the determination based on the power generation amount in the solar battery (power generator), the storage capacity of the storage capacitor may be extracted with priority, determination may be performed based on the extracted information, and the transmission time interval may be autonomously changed based on the determination. Meanwhile, instead of the determination based on the storage capacity in the storage capacitor, the power generation amount in the solar battery may be extracted with priority, determination may be performed based on the extracted information, and the transmission time interval may be autonomously changed based on the determination. For example, in a case where the transmission time interval may be longer and continuous transmission is desired, instead of the power generation amount in the solar battery, the power storage amount in the storage capacitor may be monitored with priority, and the transmission time interval may be changed primarily based on the storage capacity. In an environment in which the power generation situation of the power generator is not changed over a given period of time, for example, in a case where a sensor node is arranged in a sunny window, or the like, the power generation amount by the power generator may be monitored with priority, and the transmission time interval may be changed primarily based on the power generation amount.

Although the embodiments of the invention have been described, the respective processors constituting the environment monitor 210C (or 210, 210A, 210B) described above may be realized by dedicated hardware. Furthermore, a program for realizing the functions of the respective processors may be recorded on a computer-readable recording medium, and the program recorded on the recording medium may be read and executed, whereby the function of the environment monitor may be realized.

That is, the environment monitor 210C (or 210A, 210B) may have an internal computer system. The process of a sequence of processing relating to the processing described above may be stored in a computer-readable medium in a format of a program, and the computer may read and execute the program, whereby the processing described above may be performed. The computer-readable recording medium refers to a semiconductor memory or the like.

While the embodiments of the invention have been described, it should be understood that these are exemplary of the invention and are not to be considered as limiting. Additions, omissions, substitutions, and other alterations can be made without departing from the scope of the invention. Accordingly, the invention is not to be considered as being limited by the foregoing description, and is only limited by the scope of the appended claims.

DESCRIPTION OF REFERENCE NUMERAL

1: wireless sensor system
10, 10A, 10B, 10C: sensor node
20: monitoring center
100: power storage
110: solar battery (power generator)
120: electricity storage
121: first storage capacitor A
122: second storage capacitor B
141: first switch
142: second switch
160: first switcher
170: second switcher
200, 200A, 200B, 200C: communicator (transmitter)
210, 210A, 210B, 210C: environment monitor
211: temperature sensor (environment sensor)
212: humidity sensor (environment sensor)
213: illuminance sensor (detector, acquisition sensor)
220, 220A, 220B, 220C: controller (transmission controller)
230, 230C, 230B, 230C: mode setter
231: illuminance determiner
232: voltage determiner
232A: first voltage determiner
232B: second voltage determiner
233: saturation voltage detector
240, 240A: transmission unit
300: switching device
310: first switcher
320: second switcher

The invention claimed is:

1. A sensor node comprising:
a power generator configured to perform environmental power generation;
a power storage configured to store energy generated by the power generator to generate a power supply;
a transmitter having an environment sensor, a transmission controller, and a transmission unit, the environment sensor being configured to acquire information relating to a surrounding environment;
a first switcher provided between the transmission controller and the power storage; and
a second switcher provided between the transmission unit and the power storage,
wherein, in a case where the storage capacity of the power storage decreases to a first threshold or less and then the storage capacity increases, when the storage capacity reaches the first threshold, the first switcher is brought into an on-state and the first switcher supplies electric power to the transmission controller, and
when the storage capacity reaches a second threshold higher than the first threshold, the second switcher is brought into an on-state and the second switcher supplies electric power to the transmission unit.

2. The sensor node according to claim 1,
wherein, in a case where the storage capacity is equal to or greater than the first threshold and less than the second threshold, the transmission controller temporarily brings the second switcher into the on-state, the second switcher temporarily supplies electric power to the transmission unit, and the transmission controller causes the transmission unit to transmit the information acquired by the environment sensor and then brings the second switcher into an off-state.

3. The sensor node according to claim 1,
wherein, after the first switcher is brought into the on-state, when initial communication by the transmission unit is performed, the transmission controller causes the transmission unit to transmit an activation notification.

4. The sensor node according to claim 1,
wherein the first switcher supplies electric power to the environment sensor simultaneously with supplying electric power to the transmission controller.

5. The sensor node according to claim 1,
wherein, in a case where the storage capacity increases to the second threshold or more and then the storage capacity decreases, when the storage capacity reaches a third threshold equal to or less than the second threshold and greater than the first threshold, the second switcher is brought into the off-state and the second switcher shuts off the supply of electric power to the transmission unit, and
when the storage capacity reaches a fourth threshold equal to or less than the first threshold, the first switcher is brought into an off-state and the first switcher shuts off the supply of electric power to the transmission controller.

6. The sensor node according to claim 1,
wherein the power storage has a first storage capacitor, and a second storage capacitor which has capacity greater than the capacity of the first storage capacitor.

7. The sensor node according to claim 6,
wherein, in a case where the storage capacity of the first storage capacitor is equal to or greater than the first threshold, the first switcher is brought into the on-state, and
in a case where the storage capacity of the second storage capacitor is equal to or greater than the second threshold, the second switcher is brought into the on-state.

8. The sensor node according to claim 6,
wherein the power storage has a switch between the first storage capacitor and the second storage capacitor,
in a case where the storage capacity is less than the first threshold, the power generator and the first storage capacitor are connected to each other, the switch is brought into an off-state, and the supply of electric power to the second storage capacitor is shut off, and
in a case where the storage capacity reaches the first threshold, the switch is brought into an on-state and electric power is supplied to the second storage capacitor.

9. The sensor node according to claim 1, further comprising:
a detector configured to detect an amount of energy generated by the power generator,
wherein the transmission unit transmits a transmission signal including the information acquired by the environment sensor in a wireless manner, and
the transmission controller changes a mode of a transmission operation in the transmission unit based on a detection result of the amount of energy generated by the power generator from the detector.

10. The sensor node according to claim 1,
wherein the transmission controller acquires information relating to the storage capacity of the power storage and changes a mode of a transmission operation in the transmission unit based on the acquired information relating to the storage capacity.

11. The sensor node according to claim 1, wherein, in a case where the storage capacity of the power storage exceeds a predetermined threshold, a mode of a transmission operation in the transmission unit is changed such that consumption of energy stored in the power storage is increased.

12. The sensor node according to claim 1, wherein the power generator is a solar battery, an acquisition sensor which measures the storage capacity generated by the power generator is an illuminance sensor, and the solar battery is a solar battery which is used in low illuminance and which is usable in an environment of predetermined amount of illuminance or less.

13. The sensor node according to claim 1, wherein each of the first switcher and the second switcher comprises a DC/DC converter.

14. A method of controlling a sensor node, the sensor node comprising a power generator configured to perform environmental power generation, a power storage configured to store energy generated by the power generator to generate a power supply, a transmitter having an environment sensor, a transmission controller, and a transmission unit, the environment sensor being configured to acquire information relating to a surrounding environment, a first switcher provided between the transmission controller and the power storage, and a second switcher provided between the transmission unit and the power storage, the method of controlling the sensor node comprising:

bringing the first switcher into an on-state in a case where the storage capacity of the power storage decreases to a first threshold or less and then the storage capacity increases, when the storage capacity reaches the first threshold;

causing the first switcher to supply electric power to the transmission controller;

bringing the second switcher into an on-state when the storage capacity reaches a second threshold higher than the first threshold; and causing the second switcher to supply electric power to the transmission unit.

* * * * *